(12) United States Patent
Hirata et al.

(10) Patent No.: US 12,550,466 B2
(45) Date of Patent: Feb. 10, 2026

(54) SOLID-STATE IMAGING ELEMENT AND ELECTRONIC DEVICE

(71) Applicant: SONY SEMICONDUCTOR SOLUTIONS CORPORATION, Kanagawa (JP)

(72) Inventors: Shintarou Hirata, Kanagawa (JP); Toshihiko Hayashi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 369 days.

(21) Appl. No.: 18/245,611

(22) PCT Filed: Sep. 2, 2021

(86) PCT No.: PCT/JP2021/032271
§ 371 (c)(1),
(2) Date: Mar. 16, 2023

(87) PCT Pub. No.: WO2022/074972
PCT Pub. Date: Apr. 14, 2022

(65) Prior Publication Data
US 2024/0030251 A1   Jan. 25, 2024

(30) Foreign Application Priority Data
Oct. 7, 2020   (JP) ................ 2020-169581

(51) Int. Cl.
*H10F 39/00*   (2025.01)
*H10F 39/18*   (2025.01)

(52) U.S. Cl.
CPC ....... *H10F 39/8057* (2025.01); *H10F 39/182* (2025.01); *H10F 39/8037* (2025.01); *H10F 39/8063* (2025.01); *H10F 39/811* (2025.01)

(58) Field of Classification Search
CPC ....... H04N 25/70; H10F 39/12; H10F 39/182; H10F 39/8037; H10F 39/8057; H10F 39/8063; H10F 39/807; H10F 39/811
See application file for complete search history.

(56) References Cited

U.S. PATENT DOCUMENTS

2018/0175097 A1   6/2018  Murata
2018/0219046 A1*  8/2018  Yamaguchi ............ H10K 30/30
(Continued)

FOREIGN PATENT DOCUMENTS

CN   104900664 A   9/2015
JP   2014-216602 A   11/2014
(Continued)

OTHER PUBLICATIONS

International Search Report and Written Opinion of PCT Application No. PCT/JP2021/032271, issued on Nov. 22, 2021, 09 pages of ISRWO.

*Primary Examiner* — Shaun M Campbell
(74) *Attorney, Agent, or Firm* — CHIP LAW GROUP

(57) ABSTRACT

Provided is a solid-state imaging element that includes a pixel array section, an isolation region, and a light shielding section. In the pixel array section, a plurality of light receiving pixels each including a photoelectric conversion layer made of an organic material and a charge storage layer that stores a charge generated in the photoelectric conversion layer is disposed side by side. The isolation region is provided between the light receiving pixels adjacent to each other in the pixel array section. The light shielding section suppresses incidence of light on the charge storage layer located in the isolation region.

7 Claims, 18 Drawing Sheets

(56) References Cited

U.S. PATENT DOCUMENTS

| | | | |
|---|---|---|---|
| 2021/0020857 A1* | 1/2021 | Hirata | H10F 39/011 |
| 2021/0143219 A1* | 5/2021 | Kataoka | H10K 30/81 |
| 2021/0273019 A1* | 9/2021 | Koyanagi | H10F 39/12 |

FOREIGN PATENT DOCUMENTS

| | | |
|---|---|---|
| JP | 2015-015332 A | 1/2015 |
| JP | 2017-037952 A | 2/2017 |
| TW | 202006960 A | 2/2020 |
| WO | 2017/010262 A1 | 1/2017 |
| WO | 2018/225367 A1 | 12/2018 |
| WO | 2020/179300 A1 | 9/2020 |

* cited by examiner

SOLID-STATE IMAGING ELEMENT AND ELECTRONIC DEVICE

CROSS REFERENCE TO RELATED APPLICATIONS

This application is a U.S. National Phase of International Patent Application No. PCT/JP2021/032271 filed on Sep. 2, 2021, which claims priority benefit of Japanese Patent Application No. JP 2020-169581 filed in the Japan Patent Office on Oct. 7, 2020. Each of the above-referenced applications is hereby incorporated herein by reference in its entirety.

FIELD

The present disclosure relates to a solid-state imaging element and an electronic device.

BACKGROUND

In recent years, a stacked-type solid-state imaging element in which a plurality of photoelectric conversion sections having different absorption coefficients for wavelengths of light is stacked has been proposed. In such a stacked-type solid-state imaging element, for example, a first photoelectric conversion section including an organic photoelectric conversion layer is formed on a light incident side face of a semiconductor layer, and second and third photoelectric conversion sections are formed inside the semiconductor layer (see, for example, Patent Literature 1).

CITATION LIST

Patent Literature

Patent Literature 1: JP 2015-15332 A

SUMMARY

Technical Problem

However, in the above-described related art, there is room for further improvement in terms of improving the imaging image quality of the photoelectric conversion section including the organic photoelectric conversion layer.

Therefore, the present disclosure proposes a solid-state imaging element and an electronic device capable of improving imaging image quality of a photoelectric conversion section including an organic photoelectric conversion layer.

Solution to Problem

According to the present disclosure, there is provided a solid-state imaging element. The solid-state imaging element includes a pixel array section, an isolation region, and a light shielding section. In the pixel array section, a plurality of light receiving pixels each including a photoelectric conversion layer made of an organic material and a charge storage layer that stores a charge generated in the photoelectric conversion layer is disposed side by side. The isolation region is provided between the light receiving pixels adjacent to each other in the pixel array section. The light shielding section suppresses incidence of light on the charge storage layer located in the isolation region.

DESCRIPTION OF EMBODIMENTS

Hereinafter, each embodiment of the present disclosure will be described in detail with reference to the drawings. In the following embodiments, the same parts are denoted by the same reference signs, and a duplicate description will be omitted.

In recent years, a stacked-type solid-state imaging element in which a plurality of photoelectric conversion sections having different absorption coefficients for wavelengths of light is stacked has been proposed. In such a stacked-type solid-state imaging element, for example, a first photoelectric conversion section including an organic photoelectric conversion layer is formed on a light incident side face of a semiconductor layer, and second and third photoelectric conversion sections are formed inside the semiconductor layer.

In addition, in recent years, in a photoelectric conversion section including an organic photoelectric conversion layer, a configuration in which a charge storage layer that stores charges generated in the organic photoelectric conversion layer is further stacked has also been proposed.

However, in an isolation region provided between adjacent light receiving pixels, when light enters a charge storage layer to which a negative bias voltage is applied, a potential of the charge storage layer that is an oxide semiconductor may change.

Then, the potential barrier of the charge storage layer located in the isolation region is lowered due to incidence of light for a long time, and thus, there is a possibility that deterioration of imaging image quality such as blooming or color mixing occurs between adjacent light receiving pixels.

Therefore, it is expected to realize a technology capable of overcoming the above-described problems and improving the imaging image quality of the photoelectric conversion section including the organic photoelectric conversion layer.

[Configuration of Solid-State Imaging Element]

Figure 1:
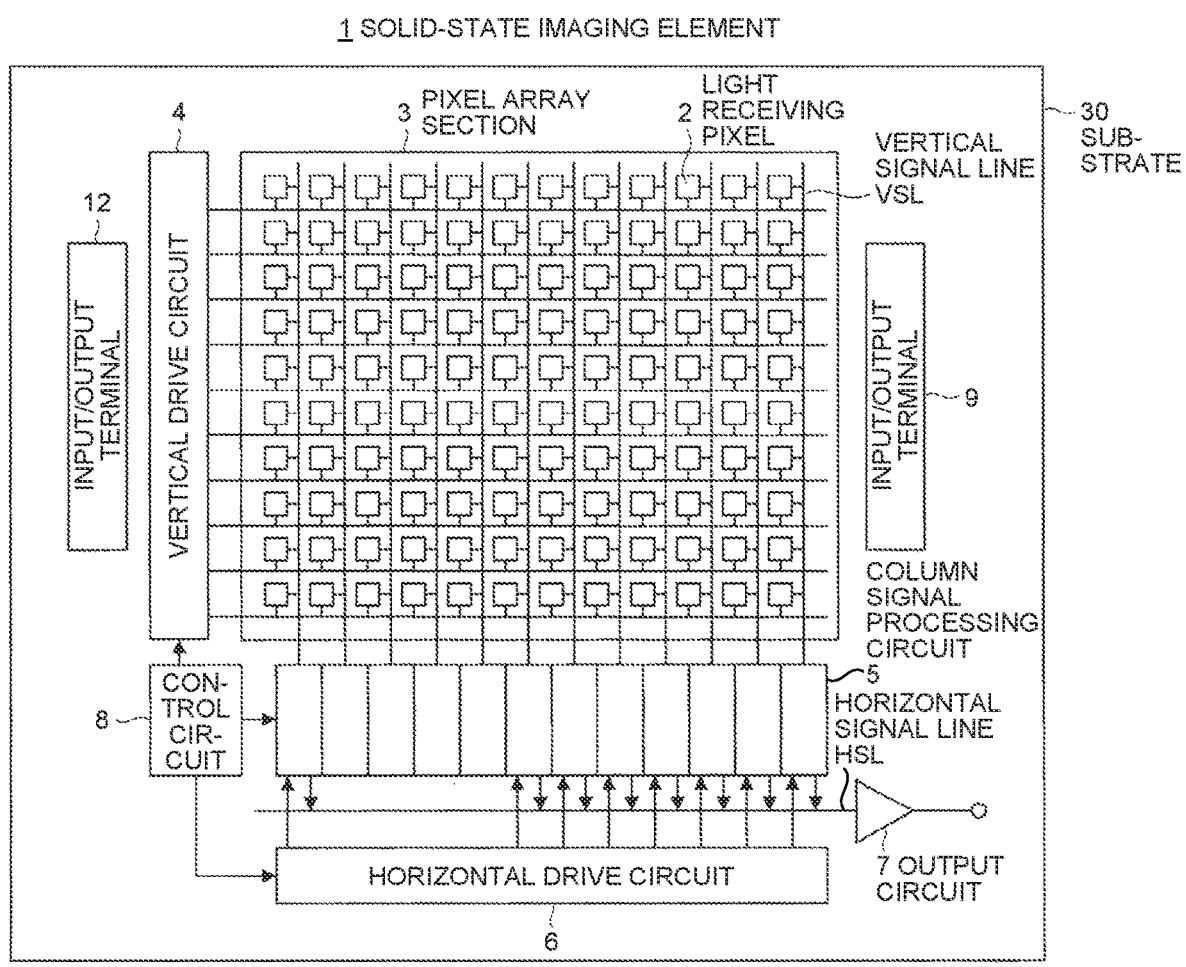
FIG. 1 is a system configuration diagram illustrating a schematic configuration example of a solid-state imaging element according to an embodiment of the present disclosure.

First, a configuration of a solid-state imaging element 1 according to an embodiment will be described with reference to FIG. 1. FIG. 1 is a system configuration diagram illustrating a schematic configuration example of the solid-state imaging element 1 according to an embodiment of the present disclosure.

As illustrated in FIG. 1, the solid-state imaging element 1 according to an embodiment includes a semiconductor substrate 30 that is, for example, a silicon (Si) substrate including a pixel array section 3 in which light receiving pixels 2 each including a plurality of photoelectric conversion sections is regularly disposed in a two-dimensional array and a peripheral circuit unit. Note that, in the following description, the light receiving pixel 2 is also simply referred to as a "pixel" or a "unit pixel".

The light receiving pixel 2 includes a photodiode serving as a photoelectric conversion section and a plurality of pixel transistors (so-called MOS transistors). The plurality of pixel transistors can include, for example, three transistors of a transfer transistor, a reset transistor, and an amplification transistor.

Furthermore, the plurality of pixel transistors can also include four transistors by further adding a selection transistor. Note that an example of an equivalent circuit of the light receiving pixel 2 will be described later.

The light receiving pixel 2 according to the embodiment can be configured as one unit pixel. Furthermore, the light receiving pixels 2 according to the embodiment may have a shared pixel structure.

This shared pixel structure includes a plurality of photodiodes, a plurality of transfer transistors, one shared floating diffusion, and another shared pixel transistor. That is, in the sharing pixel, a photodiode and a transfer transistor constituting a plurality of unit pixels are configured to share another pixel transistor.

The peripheral circuit unit of the solid-state imaging element 1 includes a vertical drive circuit 4, a column signal processing circuit 5, a horizontal drive circuit 6, an output circuit 7, and a control circuit 8.

The control circuit 8 receives an input clock and data instructing an operation mode and the like to output data such as internal information about the solid-state imaging element 1.

That is, the control circuit 8 generates a clock signal or a control signal serving as a reference of operations of the vertical drive circuit 4, the column signal processing circuit 5, the horizontal drive circuit 6, and the like on the basis of the vertical synchronization signal, the horizontal synchronization signal, and the master clock. Then, the control circuit 8 inputs these signals to the vertical drive circuit 4, the column signal processing circuit 5, the horizontal drive circuit 6, and the like.

The vertical drive circuit 4 includes, for example, a shift register, selects a pixel drive wiring, supplies a pulse for driving pixels to the selected pixel drive wiring, and drives the pixels on a row.

That is, the vertical drive circuit 4 selectively scans the light receiving pixels 2 of the pixel array section 3 sequentially in the vertical direction on a row. Then, the vertical drive circuit 4 supplies a pixel signal based on a signal charge generated according to the amount of received light in the photoelectric conversion section of each light receiving pixel 2 to the column signal processing circuit 5 through a vertical signal line VSL.

The column signal processing circuit 5 is disposed, for example, for each column of the light receiving pixels 2, and performs a signal process such as noise removal on signals output from the light receiving pixels 2 of one row for each pixel column.

That is, the column signal processing circuit 5 performs signal processes such as correlated double sampling (CDS) for removing fixed pattern noise unique to the light receiving pixel 2, signal amplification, and AD conversion. In the output stage of the column signal processing circuit 5, a horizontal selection switch (not illustrated) is provided to be connected between the column signal processing circuit 5 and a horizontal signal line HSL.

The horizontal drive circuit 6 includes, for example, a shift register, sequentially selects each of the column signal processing circuits 5 by sequentially outputting horizontal scanning pulses, and causes each of the column signal processing circuits 5 to output a pixel signal to the horizontal signal line HSL.

The output circuit 7 performs a signal process on the signals sequentially supplied from the column signal processing circuits 5 through the horizontal signal line HSL to output the processed signal. For example, the output circuit 7 may perform only buffering, or may perform black level adjustment, column variation correction, various digital signal processes, and the like. An input/output terminal 9 exchanges signals with the outside.

[Configuration of Pixel Array Section]

Figure 2:
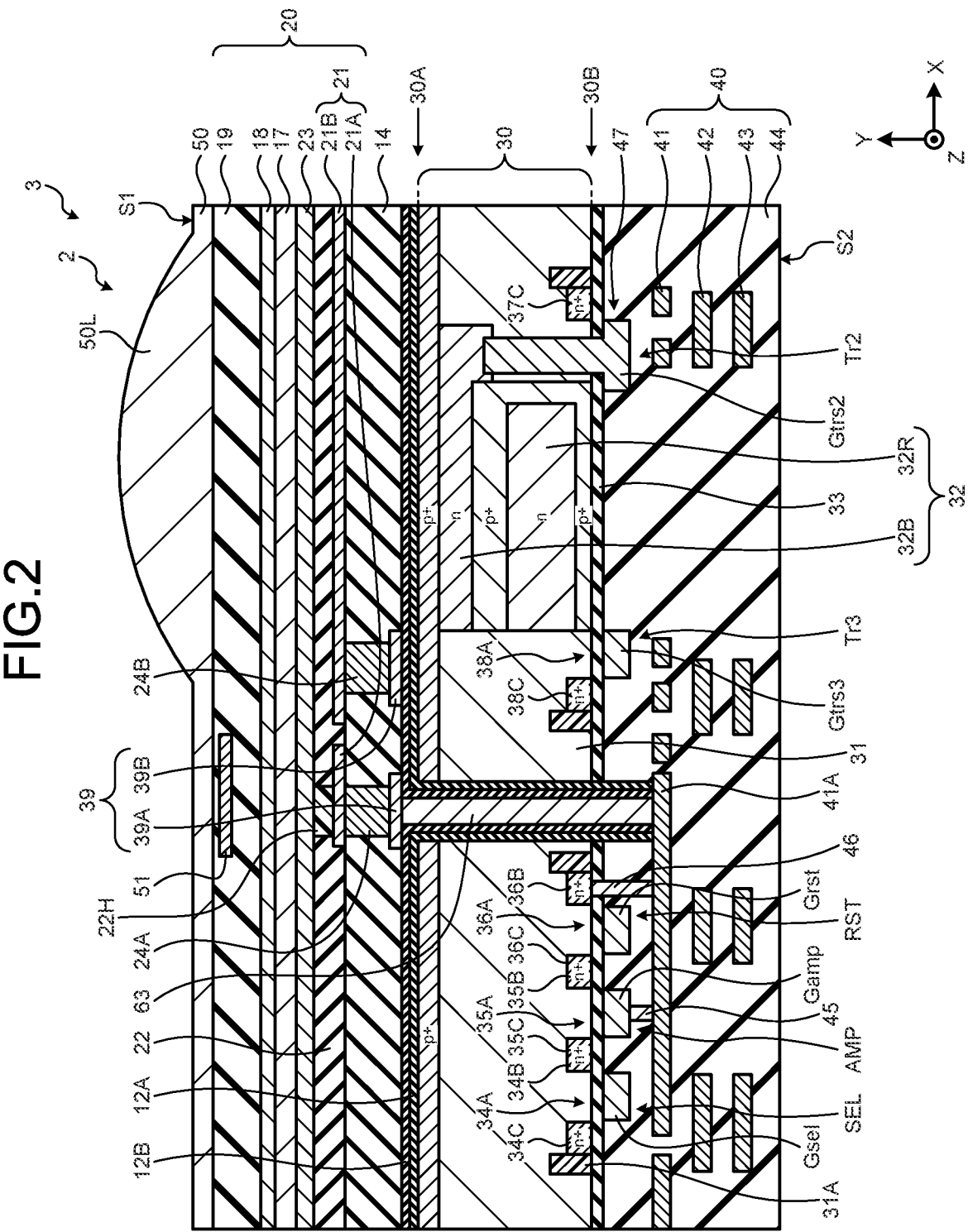
FIG. 2 is a cross-sectional view schematically illustrating a configuration of each photoelectric conversion section according to the embodiment of the present disclosure.
Figure 3:
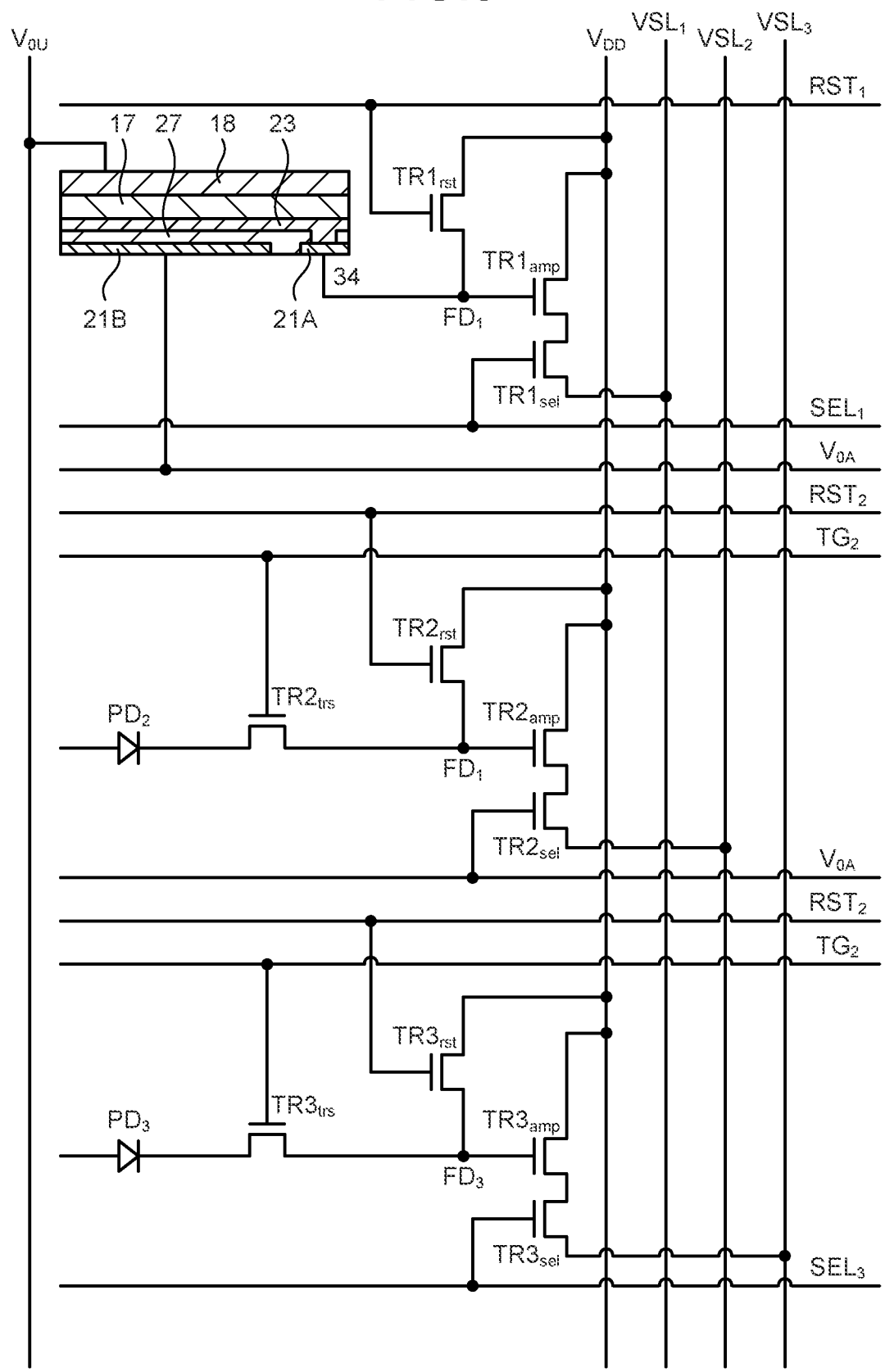
FIG. 3 is a diagram illustrating an equivalent circuit of each photoelectric conversion section according to the embodiment of the present disclosure.
Figure 4:
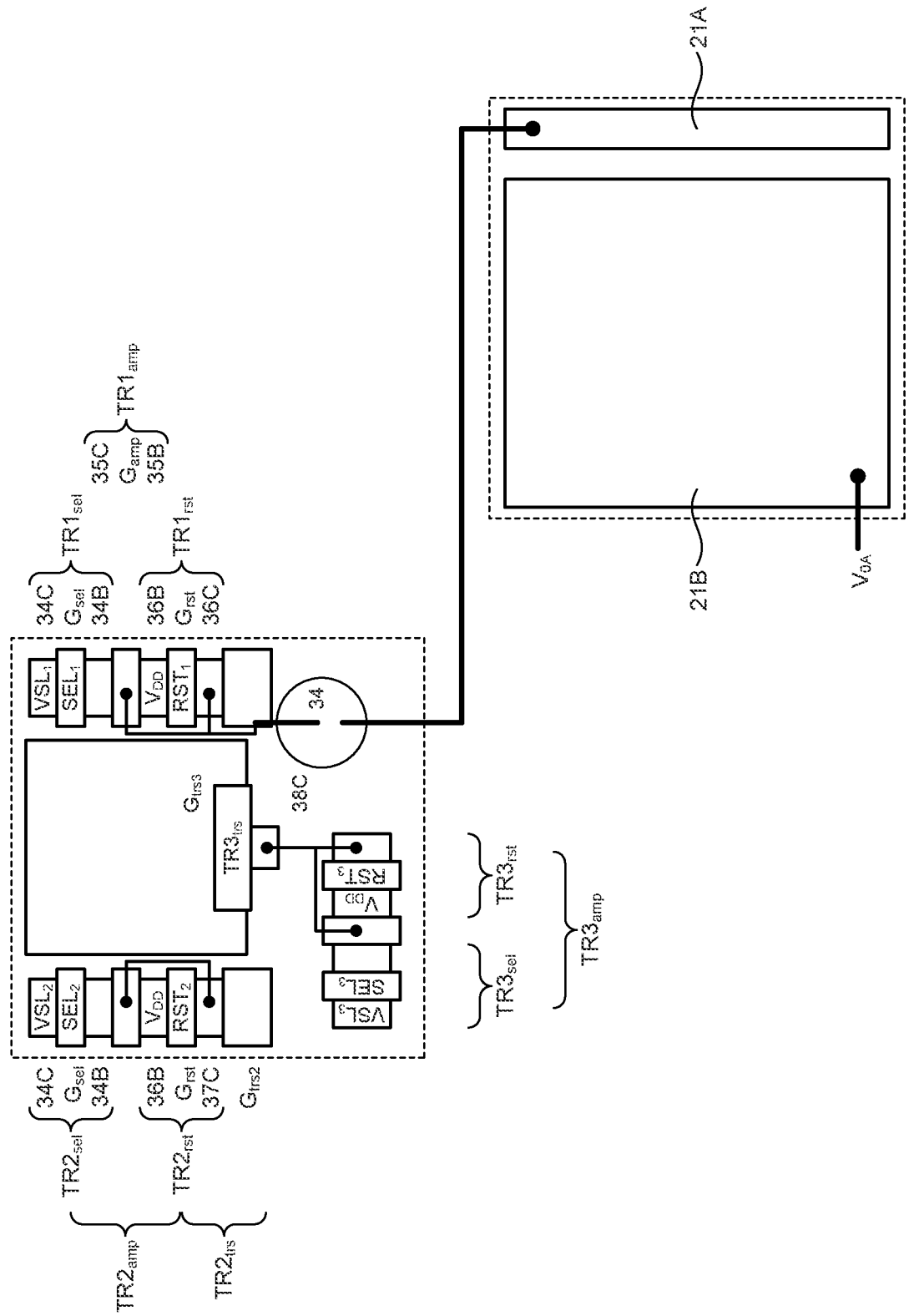
FIG. 4 is a diagram schematically illustrating an arrangement of a lower electrode of an organic photoelectric conversion section and a transistor constituting a control unit according to an embodiment of the present disclosure.

Next, a detailed configuration of the pixel array section 3 will be described with reference to FIGS. 2 to 4. FIG. 2 is a cross-sectional view schematically illustrating a configuration of each photoelectric conversion section according to the embodiment of the present disclosure, and FIG. 3 is a view illustrating an equivalent circuit of each photoelectric conversion section according to the embodiment of the present disclosure. FIG. 4 is a diagram schematically illustrating an arrangement of a lower electrode 21 of an organic photoelectric conversion section 20 and the transistors constituting the control unit according to the embodiment of the present disclosure.

The light receiving pixel 2 according to the embodiment is a so-called vertical spectroscopic pixel in which one organic photoelectric conversion section 20 that selectively detects light in different wavelength regions and performs photoelectric conversion and two inorganic photoelectric conversion sections 32B and 32R are stacked in the vertical direction.

The organic photoelectric conversion section 20 is provided on the first face (back face) 30A side of the semiconductor substrate 30. The inorganic photoelectric conversion sections 32B and 32R are embedded in the semiconductor substrate 30 and stacked in the thickness direction of the semiconductor substrate 30.

The organic photoelectric conversion section 20 and the inorganic photoelectric conversion sections 32B and 32R selectively detect light in different wavelength regions to perform photoelectric conversion. Specifically, the organic photoelectric conversion section 20 acquires a green (G) color signal. The inorganic photoelectric conversion sections 32B and 32R acquires color signals of blue (B) and red (R) due to a difference in absorption coefficient, respectively.

As a result, the light receiving pixel 2 according to the embodiment can acquire a plurality of types of color signals in one pixel without using a color filter.

At a second face 30B of the semiconductor substrate 30, for example, floating diffusions FD1 to FD3, transfer transistors Tr2 and Tr3, an amplifier transistor AMP, a reset transistor RST, a selection transistor SEL, a multilayer wiring 40, and the like are provided.

The floating diffusion FD1 is provided in a region 36B in the semiconductor substrate 30, the floating diffusion FD2 is provided in a region 37C in the semiconductor substrate 30, and the floating diffusion FD3 is provided in a region 38C in the semiconductor substrate 30. In addition, the multilayer wiring 40 has, for example, a configuration in which wiring layers 41, 42, and 43 are stacked in an insulating layer 44.

In FIG. 2, the first face (back face) 30A side of the semiconductor substrate 30 is a light incident side S1, and the second face (front face) 30B side is a wiring layer side S2.

The organic photoelectric conversion section 20 has a configuration in which, for example, the lower electrode 21, a charge storage layer 23, a photoelectric conversion layer 17, and an upper electrode 18 are stacked in this order from the first face 30A side of the semiconductor substrate 30. The upper electrode 18 is an example of an electrode layer. Note that an insulating layer 22 is provided between the lower electrode 21 and the charge storage layer 23.

The lower electrode 21 includes, for example, a reading electrode 21A and a storage electrode 21B separately formed for each light receiving pixel 2 and separated from each other via the insulating layer 22.

An opening 22H is provided in the insulating layer 22 on the reading electrode 21A, and the reading electrode 21A and the charge storage layer 23 are electrically connected via the opening 22H. Furthermore, in the present disclosure, the charge storage layer 23, the photoelectric conversion layer 17, and the upper electrode 18 are provided as continuous layers common to the plurality of light receiving pixels 2.

For example, a fixed charge layer 12A, a dielectric layer 12B, and an interlayer insulating layer 14 are provided between the first face 30A of the semiconductor substrate 30 and the lower electrode 21. A protective layer 19 including a light shielding film 51 is provided on the upper electrode 18. An optical member such as an on-chip lens layer 50 having an on-chip lens 50L is disposed on the protective layer 19.

A through electrode 63 is provided between the first face 30A and the second face 30B of the semiconductor substrate 30. The organic photoelectric conversion section 20 is connected to the gate Gamp of the amplifier transistor AMP and the one side source/drain region 36B of the reset transistor RST also serving as the floating diffusion FD1 via the through electrode 63.

As a result, in the light receiving pixel 2, the charge (here, the electron) generated in the organic photoelectric conversion section 20 toward the first face 30A of the semiconductor substrate 30 can be favorably transferred to the second face 30B side of the semiconductor substrate 30 via the through electrode 63, so that the characteristics of the pixel can be improved.

The lower end of the through electrode 63 is connected to a connection portion 41A in a wiring layer 41. The connection portion 41A and the gate Gamp of the amplifier transistor AMP are connected via a lower first contact 45.

The connection portion 41A and the floating diffusion FD1 (source/drain region 36B) are connected via, for example, a lower second contact 46. The upper end of the through electrode 63 is connected to the reading electrode 21A via, for example, a pad portion 39A and an upper first contact 24A.

The reset gate Grst of the reset transistor RST is disposed adjacent to the floating diffusion FD1 which is the one side source/drain region 36B of the reset transistor RST. As a result, the charges accumulated in the floating diffusion FD1 can be reset by the reset transistor RST.

In the light receiving pixel 2 according to the embodiment, light incident on the organic photoelectric conversion section 20 from the upper electrode 18 is absorbed by the photoelectric conversion layer 17. The excitons generated by this move to an interface between an electron donor and an electron acceptor constituting the photoelectric conversion layer 17, and are dissociated into exciton separation, that is, electrons and holes.

The charges (electrons and holes) generated here are carried to different electrodes by diffusion due to a difference in carrier concentration or an internal electric field due to a difference in work function between the anode and the cathode, and detected as photocurrent. In addition, by applying a potential between the lower electrode 21 and the upper electrode 18, transport the direction of electrons and holes can be controlled.

Hereinafter, a configuration, a material, and the like of each part will be described.

The organic photoelectric conversion section 20 is an organic photoelectric conversion element that absorbs green light corresponding to part or the whole of a selective wavelength region (for example, 495 nm or more and 570 nm or less) to generate electron-hole pairs.

The lower electrode 21 includes the reading electrode 21A and the storage electrode 21B separately formed as described above. The reading electrode 21A is for transferring the charge (here, the electron) generated in the photoelectric conversion layer 17 to the floating diffusion FD1.

The reading electrode 21A is connected to the floating diffusion FD1 (region 36B) via, for example, the upper first contact 24A, the pad portion 39A, the through electrode 63, the connection portion 41A, and the lower second contact 46.

The storage electrode 21B is for storing electrons as signal charges in the charge storage layer 23 among the charges generated in the photoelectric conversion layer 17, and for transferring the stored electrons to the reading electrode 21A.

The storage electrode 21B is provided in a region that faces the light receiving faces of the inorganic photoelectric conversion sections 32B and 32R formed in the semiconductor substrate 30 and covers these light receiving faces. The storage electrode 21B is preferably larger than the reading electrode 21A, so that a large amount of charges can be stored in the charge storage layer 23.

The lower electrode 21 is made of a conductive film having optical transparency, such as indium tin oxide (ITO). However, as a constituent material of the lower electrode 21, other than ITO, a tin oxide ($SnO_2$)-based material to which a dopant is added or a zinc oxide-based material obtained by adding a dopant to aluminum zinc oxide (ZnO) may be used.

Examples of the zinc oxide-based material include aluminum zinc oxide (AZO) doped with aluminum (Al) as a dopant, gallium zinc oxide (GZO) doped with gallium (Ga), and indium zinc oxide (IZO) doped with indium (in). CuI, $InSbO_4$, ZnMgO, $CuInO_2$, $MgIn_2O_4$, CdO, $ZnSnO_3$, or the like may be used as a constituent material of the lower electrode 21.

The photoelectric conversion layer 17 is made of an organic semiconductor material, and photoelectrically converts light having a selective wavelength (for example, green light of 495 nm or more and 570 nm or less) among incident light from the outside. The thickness of the photoelectric conversion layer 17 is, for example, 50 nm to 500 nm.

The photoelectric conversion layer 17 desirably includes one or both of a p-type organic semiconductor and an n-type organic semiconductor. The photoelectric conversion layer 17 is made of, for example, quinacridone, a quinacridone derivative, a subphthalocyanine, a subphthalocyanine derivative, or the like, and desirably contains at least one of these materials.

Note that the photoelectric conversion layer 17 is not limited to such a material, and may be, for example, at least one of naphthalene, anthracene, phenanthrene, tetracene, pyrene, perylene, fluoranthene, and the like (all including derivatives).

The photoelectric conversion layer 17 may be made of a polymer or a derivative of phenylenevinylene, fluorene, carbazole, indole, pyrene, pyrrole, picoline, thiophene, acetylene, diacetylene, or the like.

The photoelectric conversion layer 17, may be made of a metal complex dye, a cyanine dye, a merocyanine dye, a phenylxanthene dye, a triphenylmethane dye, a rhodacyanine dye, a xanthene dye, or the like.

Examples of the metal complex dye include a dithiol metal complex dye, a metal phthalocyanine dye, a metal porphyrin dye, and a ruthenium complex dye. The photoelectric conversion layer 17 may contain other organic materials such as fullerene ($C_{60}$) and bathocuproine (BCP) in addition to such an organic semiconductor dye.

When green light is photoelectrically converted by the photoelectric conversion layer 17, for example, the photoelectric conversion layer 17 can be made of a rhodamine-based dye, a melacyanine-based dye, a quinacridone derivative, a subphthalocyanine-based dye (subphthalocyanine derivative), or the like.

As in the lower electrode 21, the upper electrode 18 is made of a conductive film having optical transparency. In the solid-state imaging element 1, the upper electrode 18 may be separated for each unit pixel, or may be formed as a common electrode for each unit pixel. The thickness of the upper electrode 18 is, for example, 10 nm to 200 nm.

Note that, in the solid-state imaging element 1, another layer may be provided between the photoelectric conversion layer 17 and another layer may be provided between the lower electrode 15 and between the photoelectric conversion layer 17 and the upper electrode 18.

The insulating layer 22 electrically separates the storage electrode 21B from the charge storage layer 23. The insulating layer 22 is provided, for example, on the interlayer insulating layer 14 so as to cover the lower electrode 21.

The insulating layer 22 has an opening 22H on the reading electrode 21A in the lower electrode 21, and the reading electrode 21A and the charge storage layer 23 are electrically connected via the opening 22H.

The insulating layer 22 can be formed by, for example, the same material as the interlayer insulating layer 14, and includes, for example, a single-layer film made of one of silicon oxide, silicon nitride, silicon oxynitride (SiON), and the like, or a laminated film made of two or more of these. The thickness of the insulating layer 22 is, for example, 20 nm to 500 nm.

In the protective layer 19, for example, the light shielding film 51 is provided on the reading electrode 21A. The light shielding film 51 may be provided so as to cover a region of the reading electrode 21A that is in direct contact with at least the charge storage layer 23 but not to overlap at least the storage electrode 21B.

On the protective layer 19, the on-chip lens layer 50 is formed so as to cover the entire surface. The plurality of on-chip lenses 50L (microlenses) is provided on the surface of the on-chip lens layer 50.

The semiconductor substrate 30 includes, for example, an n-type silicon substrate, and has a p-well 31 in a predetermined region. The transfer transistors Tr2 and Tr3, the amplifier transistor AMP, the reset transistor RST, the selection transistor SEL, and the like described above are provided on the second face 30B of the p-well 31. In addition, a peripheral circuit unit including the vertical drive circuit 4 (see FIG. 1) and the like is provided around the semiconductor substrate 30.

The reset transistor RST (reset transistor TR1*rst*) resets the charge transferred from the organic photoelectric conversion section 20 to the floating diffusion FD1, and includes, for example, a MOS transistor.

Specifically, the reset transistor RST includes a reset gate Grst, a channel formation region 36A, and source/drain regions 36B and 36C. The reset gate Grst is connected to a reset line RST1.

The one side source/drain region 36B constituting the reset transistor TR1*rst* also serves as the floating diffusion FD1. The other side source/drain region 36C constituting the reset transistor TR1*rst* is connected to a power supply VDD.

The amplifier transistor AMP (amplifier transistor TR1*amp*) is a modulation element that modulates the amount of charges generated in the organic photoelectric conversion section 20 to a voltage, and includes, for example, a MOS transistor. Specifically, the amplifier transistor AMP includes a gate Gamp, a channel formation region 35A, and source/drain regions 35B and 35C.

The gate Gamp is connected to the reading electrode 21A and the one side source/drain region 36B of the reset transistor TR1*rst* via the lower first contact 45, the connection portion 41A, the lower second contact 46, the through electrode 63, and the like.

Furthermore, the one side source/drain region 35B constituting the amplifier transistor TR1*amp* shares the other side source/drain region 36C constituting the reset transistor TR1*rst*, and is connected to the power supply VDD.

The selection transistor SEL (selection transistor TR1*sel*) includes a gate Gsel, a channel formation region 34A, and source/drain regions 34B and 34C. The gate Gsel is connected to a selection line SEL1.

Further, the one side source/drain region 34B constituting the selection transistor TR1*sel* shares the other side source/drain region 35C constituting the amplifier transistor TR1*amp*. The other side source/drain region 34C constituting the selection transistor TR1*sel* is connected to the signal line (data output line) VSL1.

Each of the inorganic photoelectric conversion sections 32B and 32R has a pn junction in a predetermined region of the semiconductor substrate 30. The inorganic photoelectric conversion sections 32B and 32R are capable of splitting light in the longitudinal direction by utilizing the fact that the wavelength of light absorbed in the silicon substrate varies depending on the incident depth of light.

The inorganic photoelectric conversion section 32B selectively detects blue light and accumulates signal charges corresponding to blue, and is installed at a depth at which blue light can be efficiently photoelectrically converted. The inorganic photoelectric conversion section 32R selectively detects red light and accumulates signal charges corresponding to red, and is installed at a depth at which red light can be efficiently photoelectrically converted.

In the present disclosure, blue (B) is a color corresponding to, for example, a wavelength region of 450 nm to 495 nm, and red (R) is a color corresponding to, for example, a wavelength region of 620 nm to 750 nm. In addition, green (G) is a color corresponding to a wavelength region of 495 nm to 570 nm, for example. Each of the inorganic photoelectric conversion sections 32B and 32R is only required to be able to detect light in part or all of the wavelength regions.

The inorganic photoelectric conversion section 32B includes, for example, a p+ region serving as a hole storage layer and an n region serving as an electron storage layer. The inorganic photoelectric conversion section 32R includes, for example, a p+ region serving as a hole storage layer and an n region serving as an electron storage layer (having a p-n-p stacked structure).

The n region of the inorganic photoelectric conversion section 32B is connected to the vertical transfer transistor Tr2. The p+ region of the inorganic photoelectric conversion section 32B is bent along the transfer transistor Tr2 and connected to the p+ region of the inorganic photoelectric conversion section 32R.

The transfer transistor Tr2 (transfer transistor TR2*trs*) transfers the signal charge (here, the electron), corresponding to blue, generated and accumulated in the inorganic photoelectric conversion section 32B to the floating diffusion FD2.

Since the inorganic photoelectric conversion section 32B is formed at a position deep from the second face 30B of the semiconductor substrate 30, the transfer transistor TR2*trs* of the inorganic photoelectric conversion section 32B is preferably configured by a vertical transistor.

In addition, the transfer transistor TR2*trs* is connected to a transfer gate line TG2. Further, the floating diffusion FD2 is provided in the region 37C in the vicinity of a gate Gtrs2 of the transfer transistor TR2*trs*. The charges accumulated in the inorganic photoelectric conversion section 32B are read out to the floating diffusion FD2 via the transfer channel formed along the gate Gtrs2.

The transfer transistor Tr3 (transfer transistor TR3*trs*) transfers signal charges (here, the electron), corresponding to red, generated and accumulated in the inorganic photoelectric conversion section 32R to the floating diffusion FD3.

The transfer transistor TR3*trs* includes, for example, a MOS transistor. In addition, the transfer transistor TR3*trs* is connected to a transfer gate line TG3. Further, the floating diffusion FD3 is provided in the region 38C near a gate Gtrs3 of the transfer transistor TR3*trs*.

The charge accumulated in the inorganic photoelectric conversion section 32R is read out to the floating diffusion FD3 via the transfer channel formed along the gate Gtrs3.

A reset transistor TR2*rst*, an amplifier transistor TR2*amp*, and a selection transistor TR2*sel* constituting a control unit of the inorganic photoelectric conversion section 32B are further provided toward the second face 30B side of the semiconductor substrate 30.

The reset transistor TR2*rst* includes a gate, a channel formation region, and a source/drain region. The gate of the reset transistor TR2*rst* is connected to a reset line RST2, and the one side source/drain region of the reset transistor TR2*rst* is connected to the power supply VDD. The other side source/drain region of the reset transistor TR2*rst* also serves as the floating diffusion FD2.

The amplifier transistor TR2*amp* includes a gate, a channel formation region, and a source/drain region. The gate is connected to the other side source/drain region (floating diffusion FD2) of the reset transistor TR2*rst*.

Furthermore, the one side source/drain region constituting the amplifier transistor TR2*amp* shares the one side source/drain region constituting the reset transistor TR2*rst*, and is connected to the power supply VDD.

The selection transistor TR2*sel* includes a gate, a channel formation region, and a source/drain region. The gate of the selection transistor TR2*sel* is connected to a selection line SEL2.

In addition, the one side source/drain region constituting the selection transistor TR2*sel* shares the other side source/drain region constituting the amplifier transistor TR2*amp*. The other side source/drain region constituting the selection transistor TR2*sel* is connected to a signal line (data output line) VSL2.

A reset transistor TR3*rst*, an amplifier transistor TR3*amp*, and a selection transistor TR3*sel* constituting a control unit of the inorganic photoelectric conversion section 32R are further provided toward the second face 30B of the semiconductor substrate 30.

The reset transistor TR3*rst* includes a gate, a channel formation region, and a source/drain region. The A gate of the reset transistor TR3*rst* is connected to a reset line RST3, and the one side source/drain region constituting the reset transistor TR3*rst* is connected to the power supply VDD. The other side source/drain region constituting the reset transistor TR3*rst* also serves as the floating diffusion FD3.

The amplifier transistor TR3*amp* includes a gate, a channel formation region, and a source/drain region. The gate of the amplifier transistor TR3*amp* is connected to the other side source/drain region (floating diffusion FD3) constituting the reset transistor TR3*rst*.

Furthermore, the one side source/drain region constituting the amplifier transistor TR3*amp* shares the one side source/drain region constituting the reset transistor TR3*rst*, and is connected to the power supply VDD.

The selection transistor TR3*sel* includes a gate, a channel formation region, and a source/drain region. The gate of the selection transistor TR3*sel* is connected to a selection line SEL3.

In addition, the one side source/drain region constituting the selection transistor TR3*sel* shares the other side source/drain region constituting the amplifier transistor TR3*amp*. The other side source/drain region constituting the selection transistor TR3*sel* is connected to a signal line (data output line) VSL3.

Each of the reset lines RST1, RST2, and RST3, the selection lines SEL1, SEL2, and SEL3, and the transfer gate lines TG2 and TG3 is connected to the vertical drive circuit 4 constituting the drive circuit. The signal lines (data output lines) VSL1, VSL2, and VSL3 are connected to a column signal processing circuit 5 constituting a drive circuit.

The lower first contact 45, the lower second contact 46, the upper first contact 24A, and an upper second contact 24B are made of, for example, a doped silicon material or a metal material.

Examples of the doped silicon material include phosphorus doped amorphous silicon (PDAS) and the like. Examples of the metal material include aluminum (Al), tungsten (W), titanium (Ti), cobalt (Co), hafnium (Hf), and tantalum (Ta).

[Configuration of Organic Photoelectric Conversion Section]

Figure 5:
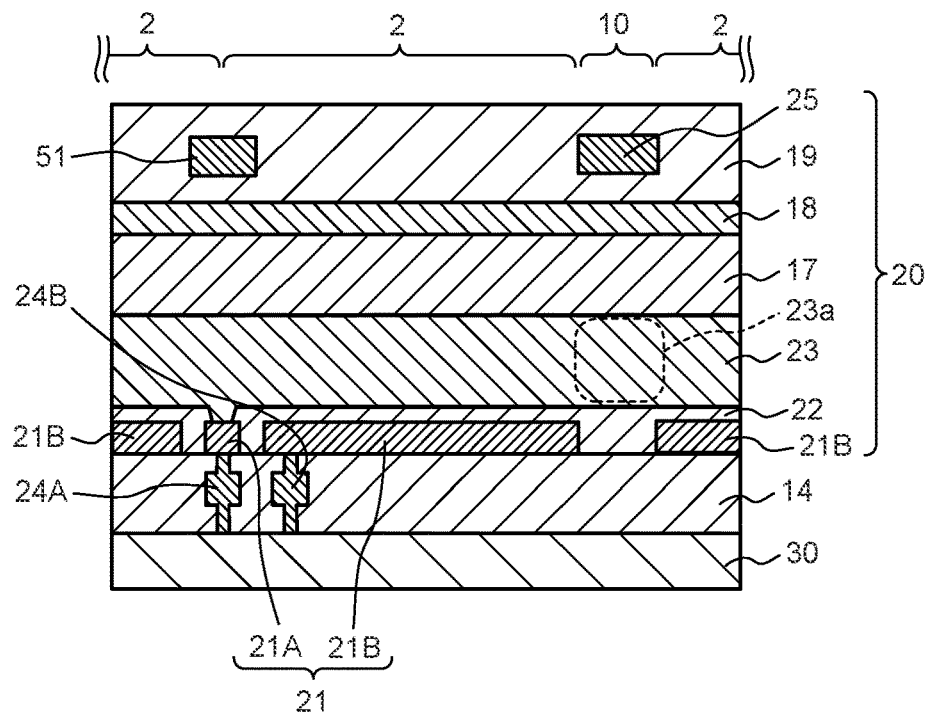
FIG. 5 is a cross-sectional view schematically illustrating a configuration of an organic photoelectric conversion section according to an embodiment of the present disclosure.

Next, a detailed configuration of the organic photoelectric conversion section 20 will be described with reference to FIGS. 5 and 6. FIG. 5 is a cross-sectional view schematically illustrating a configuration of the organic photoelectric conversion section 20 according to the embodiment of the present disclosure, and FIG. 6 is a plan view schematically illustrating a configuration of the organic photoelectric conversion section according to the embodiment of the present disclosure.

As described above, the organic photoelectric conversion section 20 according to the embodiment is provided between the interlayer insulating layer 14 and the on-chip lens layer 50 (see FIG. 2). The organic photoelectric conversion section 20 according to the embodiment includes the lower electrode 21 (the reading electrode 21A and the storage electrode 21B), the insulating layer 22, the charge storage layer 23, the photoelectric conversion layer 17, the upper electrode 18, and the protective layer 19.

Figure 6:
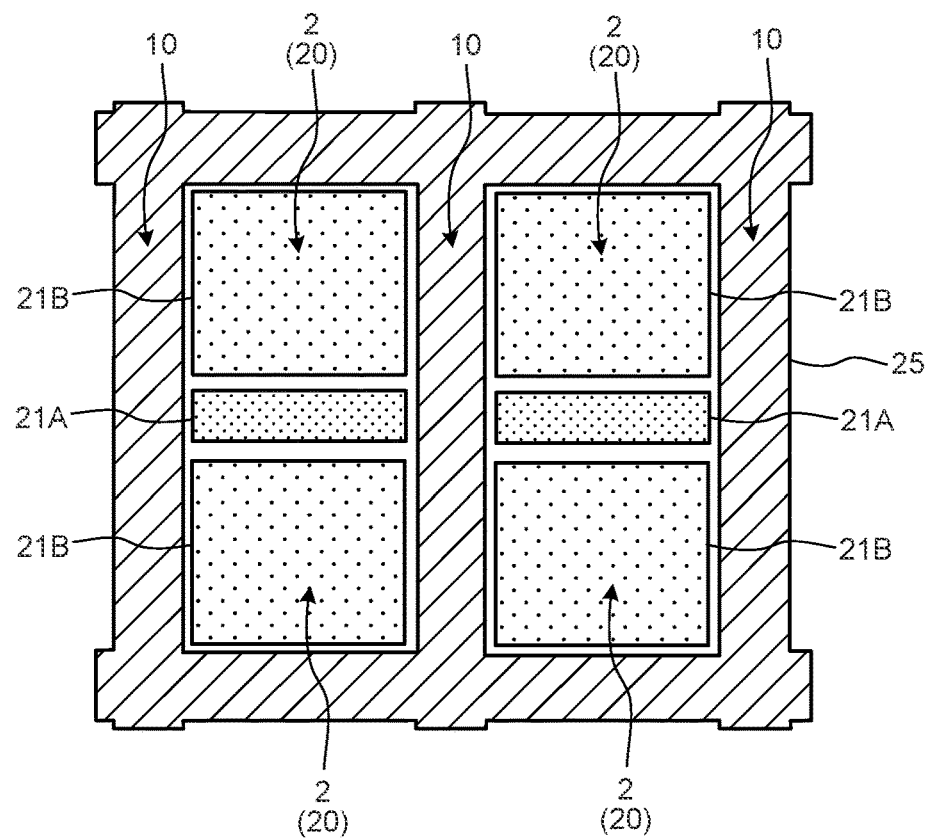
FIG. 6 is a plan view schematically illustrating a configuration of an organic photoelectric conversion section according to an embodiment of the present disclosure.

Furthermore, in the examples of FIGS. 5 and 6, each of the light receiving pixels 2 has one storage electrode 21B, and a pair of adjacent light receiving pixels 2 shares one reading electrode 21A. Furthermore, an isolation region 10 is provided between the light receiving pixels 2 adjacent to each other and not sharing one reading electrode 21A.

Charges generated by photoelectric conversion by the photoelectric conversion layer 17 of the light receiving pixel 2 are transferred to the floating diffusion FD1 (see FIG. 3) via the upper first contact 24A or the like. The floating diffusion FD1 temporarily accumulates the charge photoelectrically converted by the photoelectric conversion layer 17 until the charge is read out by the corresponding selection transistor SEL (see FIG. 2).

Specifically, in the organic photoelectric conversion section 20, a predetermined voltage is applied from a drive circuit (not illustrated) to the reading electrode 21A, the storage electrode 21B, and the upper electrode 18 in a charge accumulation period.

For example, in the charge accumulation period, a positive voltage is applied to the reading electrode 21A and the storage electrode 21B, and a negative voltage is applied to the upper electrode 18. Furthermore, in the charge accumulation period, a larger positive voltage is applied to the storage electrode 21B than to the reading electrode 21A.

As a result, in the charge accumulation period, electrons included in the charge generated by photoelectric conversion by the photoelectric conversion layer 17 are attracted by the large positive voltage of the storage electrode 21B and accumulated in the charge storage layer 23.

Furthermore, in the light receiving pixel 2, the reset operation is performed by operating the reset transistor RST (see FIG. 2) in the late stage of the charge accumulation period. As a result, the potential of the floating diffusion FD1 is reset, and the potential of the floating diffusion FD1 is the power supply voltage.

In the light receiving pixel 2, the charge transfer operation is performed after completion of the reset operation. In the charge transfer operation, a positive voltage higher than the storage electrode 21B is applied from the drive circuit to the reading electrode 21A. As a result, the electrons accumulated in the charge storage layer 23 are transferred to the floating diffusion FD1 via the reading electrode 21A, the upper first contact 24A, and the like.

In the light receiving pixel 2 according to the embodiment, a series of operations such as a charge accumulation operation, a reset operation, and a charge transfer operation is completed by the above operations.

Here, in the embodiment, when a positive voltage is applied to the storage electrodes 21B of the adjacent light receiving pixels 2 via the isolation region 10 and a negative voltage is applied to the upper electrode 18, a negative bias voltage may be applied to a charge storage layer 23*a* located in the isolation region 10.

When light is incident on the charge storage layer 23*a* to which a negative bias voltage is applied, the potential of the charge storage layer 23*a* that is an oxide semiconductor may change due to the incident light.

Furthermore, the potential barrier of the charge storage layer 23a located in the isolation region 10 is lowered by the incidence of light for a long time, and thus, there is a possibility that deterioration in imaging image quality such as blooming or color mixture occurs between the adjacent light receiving pixels 2.

Therefore, in the embodiment, as illustrated in FIG. 5, a metal film 25 for suppressing incidence of light on the charge storage layer 23a located in the isolation region 10 is provided in the organic photoelectric conversion section 20. The metal film 25 is an example of a light shielding section.

The metal film 25 is located in the isolation region 10 in plan view as illustrated in FIG. 6, and is provided closer to the light incident side (for example, the inside of the protective layer 19) than the charge storage layer 23 (that is, the charge storage layer 23a) as illustrated in FIG. 5. The metal film 25 is made of a metal material having a high light shielding property, such as tungsten or aluminum.

In the embodiment, by providing the metal film 25 in the organic photoelectric conversion section 20, it is possible to suppress a change in the potential of the charge storage layer 23a which is an oxide semiconductor due to light incidence. Therefore, according to the embodiment, the occurrence of blooming, color mixing, or the like between the adjacent light receiving pixels 2 can be suppressed, so that the imaging image quality of the organic photoelectric conversion section 20 can be improved.

In the embodiment, the metal film 25 as the light shielding section may suppress transmission of light (for example, light having a wavelength of less than 495 nm) having a wavelength shorter than that in at least the green wavelength region. For example, in the metal film 25 according to the embodiment, the transmittance of light having a wavelength shorter than that in the green wavelength region is preferably 50% or less, and more preferably 10% or less.

As a result, in the charge storage layer 23 formed of an oxide semiconductor having a band gap of about 3 (eV), excitation of electrons due to incidence of light having a wavelength shorter than that in the green wavelength region and high light energy can be effectively suppressed.

That is, in the embodiment, a change in the potential of the charge storage layer 23a can be effectively suppressed. Therefore, according to the embodiment, the occurrence of blooming, color mixing, or the like between the adjacent light receiving pixels 2 can be further suppressed, so that the imaging image quality of the organic photoelectric conversion section 20 can be further improved.

On the other hand, by configuring the metal film 25 by a metal material having a high light blocking property such as tungsten or aluminum, it is possible to suppress incidence of light in a wide wavelength region on the charge storage layer 23a of the isolation region 10. Therefore, according to the embodiment, the imaging image quality of the organic photoelectric conversion section 20 can be further improved.

Further, in the embodiment, the metal film 25 and the light shielding film 51 provided so as to cover the reading electrode 21A may be formed of the same metal layer. As a result, the step of additionally providing the metal film 25 can be omitted, so that the manufacturing cost of the solid-state imaging element 1 can be reduced.

Note that, in the embodiment, an example in which the metal film 25 is provided inside the protective layer 19 is described, but the metal film 25 is not limited to being provided inside the protective layer 19, and may be provided in a portion closer to the light incident side than the charge storage layer 23, such as the upper electrode 18 and the photoelectric conversion layer 17.

Figure 7:
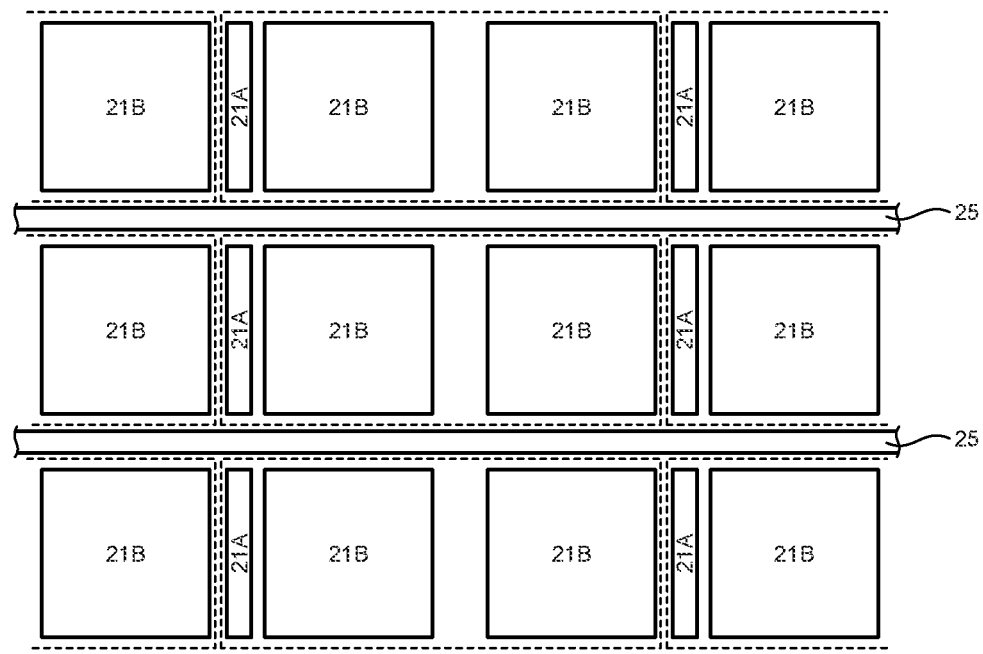
FIG. 7 is a plan view schematically illustrating another configuration of the organic photoelectric conversion section according to the embodiment of the present disclosure.
Figure 8:
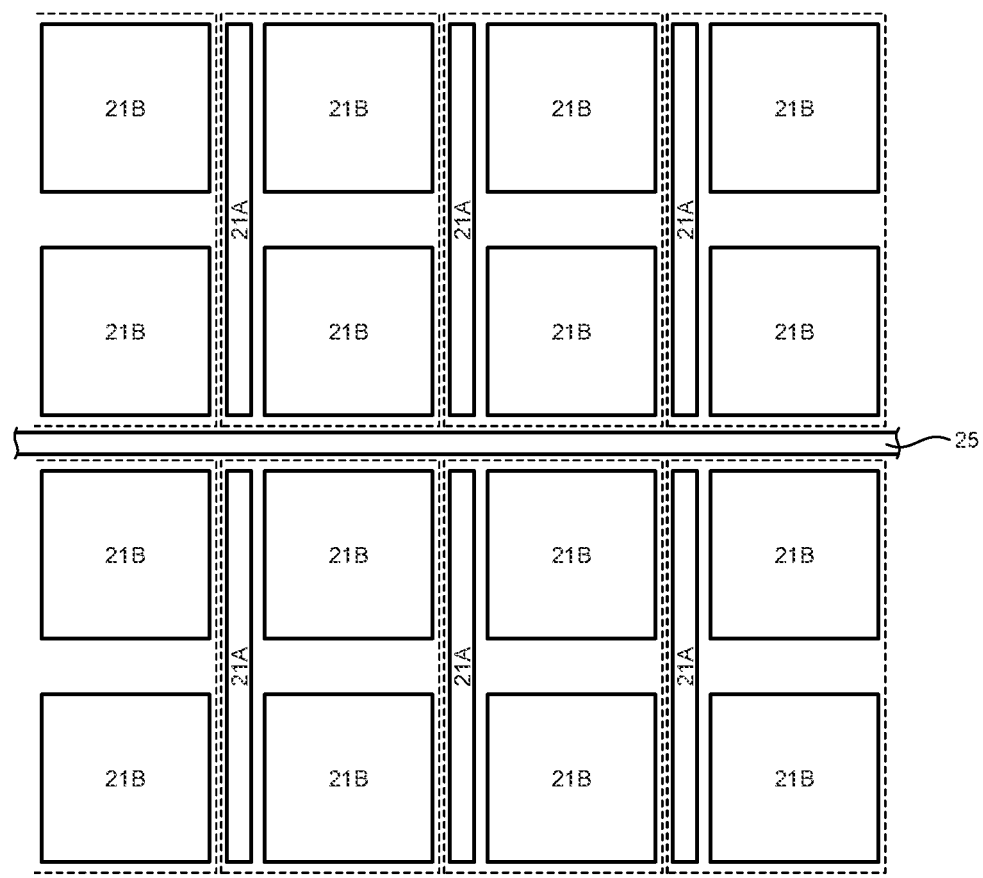
FIG. 8 is a plan view schematically illustrating another configuration of the organic photoelectric conversion section according to the embodiment of the present disclosure.
Figure 9:
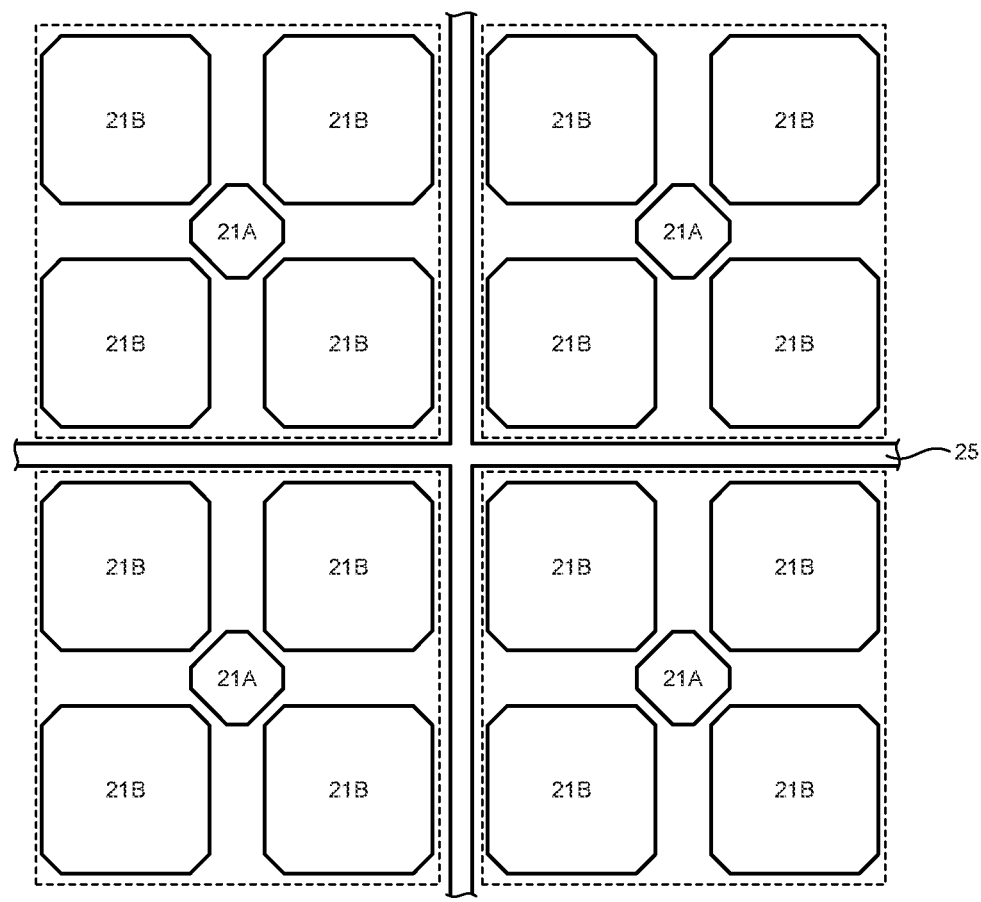
FIG. 9 is a plan view schematically illustrating another configuration of the organic photoelectric conversion section according to the embodiment of the present disclosure.

Furthermore, the planar configuration of the pixel array section 3 is not limited to the example of FIG. 6, and the metal film 25 according to the embodiment can also be applied to the pixel array section 3 having various planar configurations as illustrated in FIGS. 7 to 9.

[Various Modifications]
<First Modification>

Figure 10:
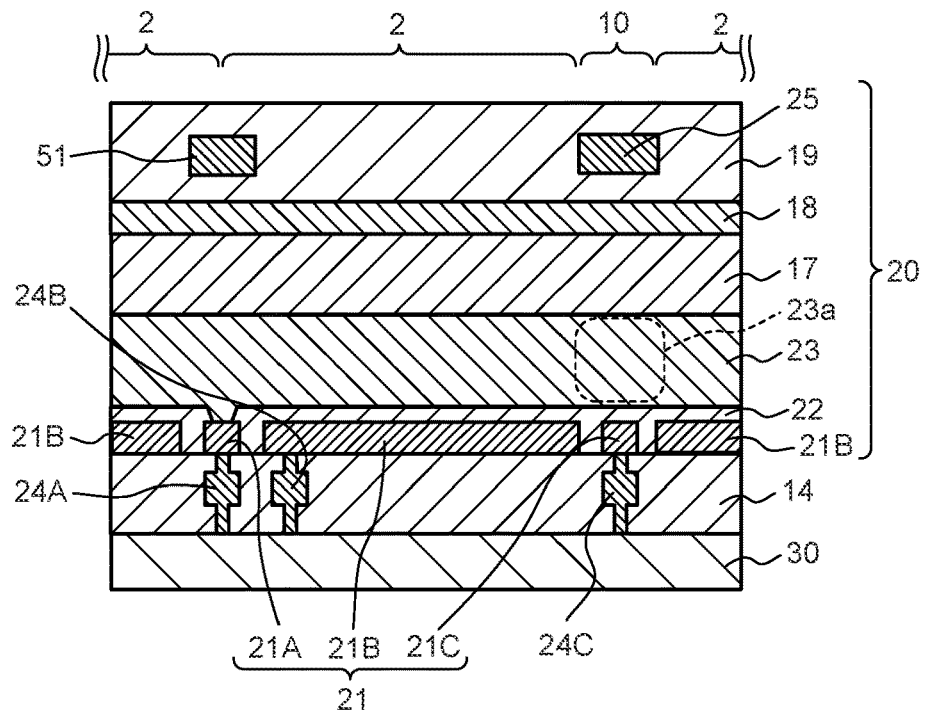
FIG. 10 is a cross-sectional view schematically illustrating a configuration of an organic photoelectric conversion section according to a first modification of the embodiment of the present disclosure.
Figure 11:
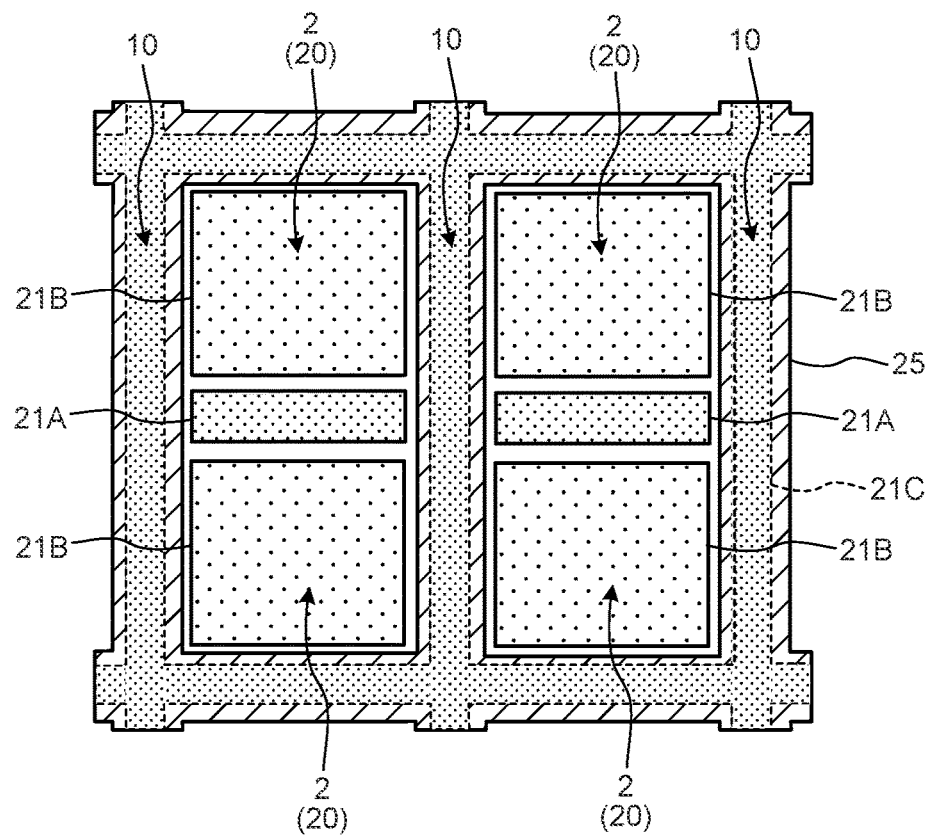
FIG. 11 is a plan view schematically illustrating a configuration of an organic photoelectric conversion section according to the first modification of the embodiment of the present disclosure.

Next, various modifications of the embodiment will be described with reference to FIGS. 10 to 21. FIG. 10 is a cross-sectional view schematically illustrating a configuration of the organic photoelectric conversion section 20 according to the first modification of the embodiment of the present disclosure, and FIG. 11 is a plan view schematically illustrating a configuration of the organic photoelectric conversion section 20 according to the first modification of the embodiment of the present disclosure.

In the organic photoelectric conversion section 20 of the first modification, the lower electrode 21 includes the reading electrode 21A, the storage electrode 21B, and a shield electrode 21C. As illustrated in FIGS. 10 and 11, the shield electrode 21C is provided in the isolation region 10.

Then, in the first modification, by applying a negative voltage to the shield electrode 21C via an upper third contact 24C or the like, a negative bias voltage can be applied to the charge storage layer 23a located in the isolation region 10.

As a result, it is possible to suppress movement of the charges (electrons in this case) accumulated in the charge storage layer 23 of one light receiving pixel 2 to the charge storage layer 23 of the adjacent light receiving pixel 2 via the charge storage layer 23a located in the isolation region 10.

Therefore, according to the first modification, since it is possible to suppress leaking of the charges accumulated in the charge storage layer 23 into the adjacent light receiving pixels 2, the adjacent light receiving pixels 2 can be satisfactorily separated in the isolation region 10.

Furthermore, in the first modification, as in the above-described embodiment, the metal film 25 that suppresses incidence of light on the charge storage layer 23a located in the isolation region 10 is provided.

As a result, it is possible to suppress a change in the potential of the charge storage layer 23a to which the bias voltage is applied by the shield electrode 21C due to incidence of light. Therefore, according to the first modification, the occurrence of blooming, color mixing, or the like between the adjacent light receiving pixels 2 can be suppressed, so that the imaging image quality of the organic photoelectric conversion section 20 can be improved.

<Second Modification>

In the embodiment and the first modification described so far, an example in which the incidence of light on the charge storage layer 23a located in the isolation region 10 is suppressed using the metal film 25 is described, but the portion where the incidence of light on the charge storage layer 23a is suppressed is not limited to the metal film 25.

Figure 12:
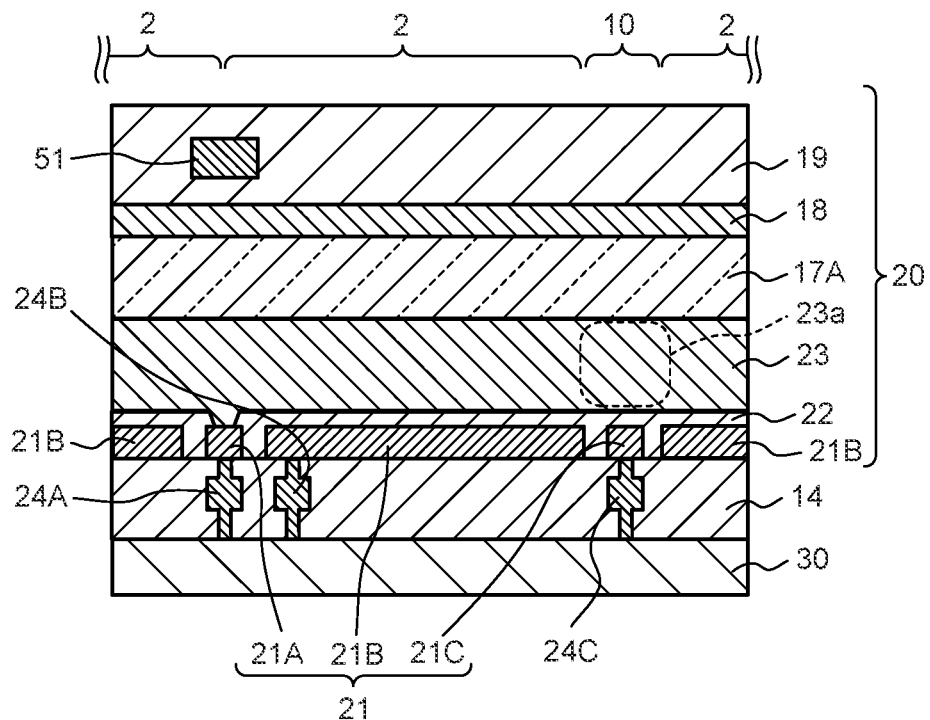
FIG. 12 is a cross-sectional view schematically illustrating a configuration of an organic photoelectric conversion section according to a second modification of the embodiment of the present disclosure.
Figure 13:
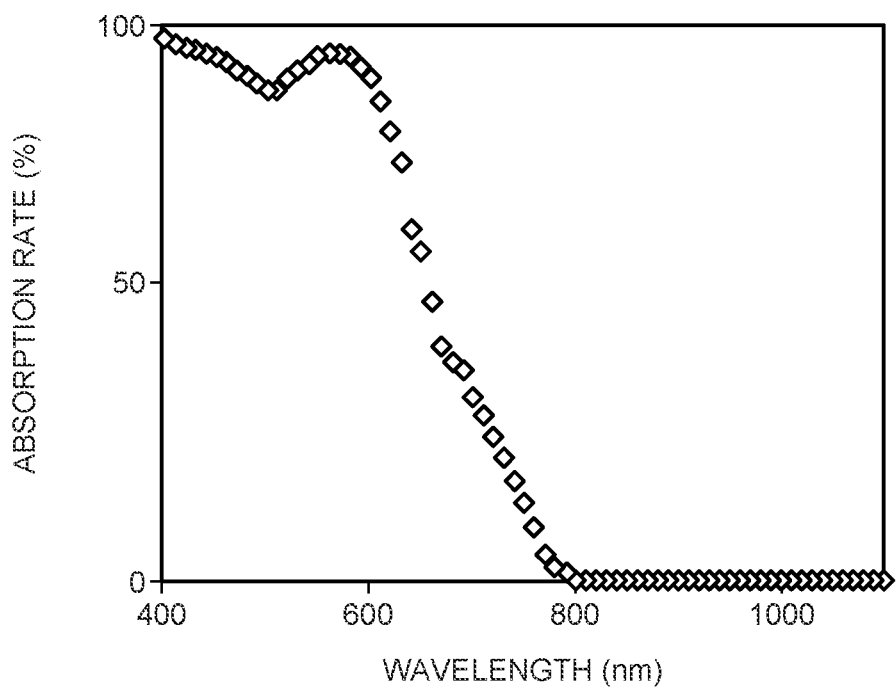
FIG. 13 is a diagram illustrating wavelength dependency of an absorption rate in a photoelectric conversion layer according to the second modification of the embodiment of the present disclosure.

FIG. 12 is a cross-sectional view schematically illustrating a configuration of the organic photoelectric conversion section 20 according to the second modification of the embodiment of the present disclosure, and FIG. 13 is a view illustrating wavelength dependency of an absorption rate in a photoelectric conversion layer 17A according to the second modification of the embodiment of the present disclosure.

In the organic photoelectric conversion section 20 of the second modification, the optical characteristics of the photoelectric conversion layer 17A are different from those of the first modification. Specifically, in the second modification, the photoelectric conversion layer 17A is made of a so-called panchromatic film having sensitivity over the entire visible light wavelength region. The photoelectric conversion layer 17A is another example of the light shielding section.

As illustrated in FIG. 13, the photoelectric conversion layer 17A made of a panchromatic film has a very high absorption rate of light having a wavelength shorter than that in the green wavelength region (for example, light having a wavelength of less than 495 nm). As a result, it is possible to suppress incidence of light having large light energy (light having a wavelength shorter than that in the green wavelength region) on the charge storage layer 23a located in the isolation region 10.

That is, in the second modification, as in the embodiment, it is possible to suppress a change in the potential of the charge storage layer 23a to which the bias voltage is applied due to the incidence of light. Therefore, according to the second modification, the occurrence of blooming, color mixing, or the like between the adjacent light receiving pixels 2 can be suppressed, so that the imaging image quality of the organic photoelectric conversion section 20 can be improved.

<Third Modification>

Figure 14:
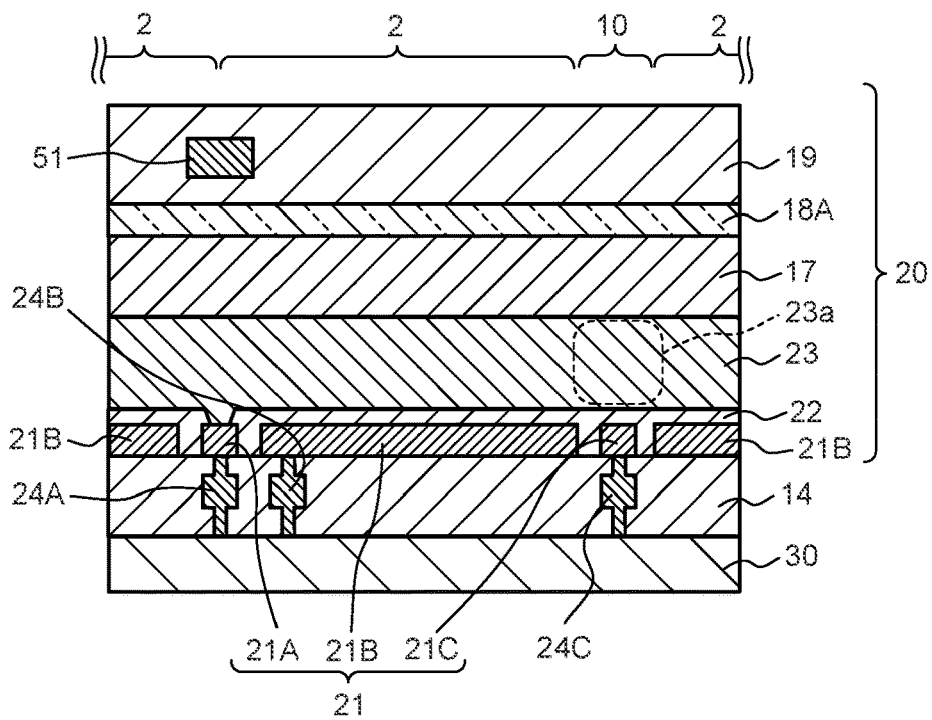
FIG. 14 is a cross-sectional view schematically illustrating a configuration of an organic photoelectric conversion section according to a third modification of the embodiment of the present disclosure.
Figure 15:
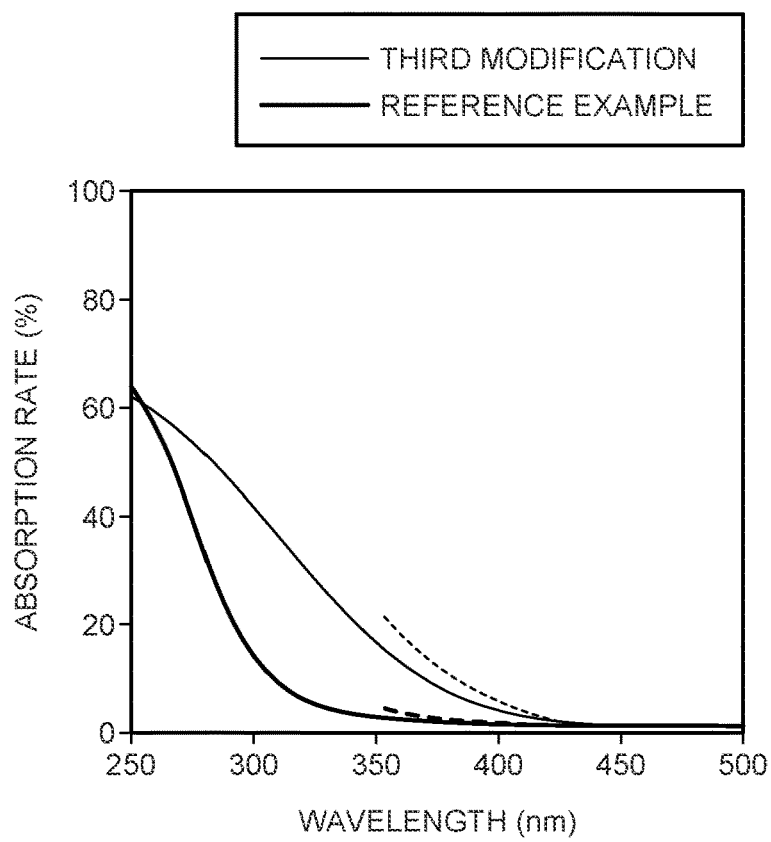
FIG. 15 is a graph illustrating wavelength dependency of an absorption rate in an upper electrode of each of the third modification of an embodiment of the present disclosure and a reference example.

FIG. 14 is a cross-sectional view schematically illustrating a configuration of an organic photoelectric conversion section 20 according to the third modification of the embodiment of the present disclosure, and FIG. 15 is a view illustrating wavelength dependency of an absorption rate in an upper electrode of each of the third modification of the embodiment of the present disclosure and a reference example.

In the organic photoelectric conversion section 20 of the third modification, the optical characteristics of an upper electrode 18A are different from those of the first modification. Specifically, in the third modification, the upper electrode 18A is made of a transparent conductive film (for example, IZO) having a high absorption rate in the ultraviolet wavelength region. The upper electrode 18A is another example of the light shielding section.

As illustrated in FIG. 15, the upper electrode 18A made of IZO has a higher absorption rate in the ultraviolet wavelength region than the upper electrode 18 (here, ITO) of the reference example. This makes it is possible to suppress incidence of ultraviolet light having high light energy on the charge storage layer 23a located in the isolation region 10.

That is, in the third modification, as in the embodiment, it is possible to suppress a change in the potential of the charge storage layer 23a to which the bias voltage is applied due to the incidence of light. Therefore, according to the third modification, the occurrence of blooming, color mixing, or the like between the adjacent light receiving pixels 2 can be suppressed, so that the imaging image quality of the organic photoelectric conversion section 20 can be improved.

<Fourth Modification>

Figure 16:
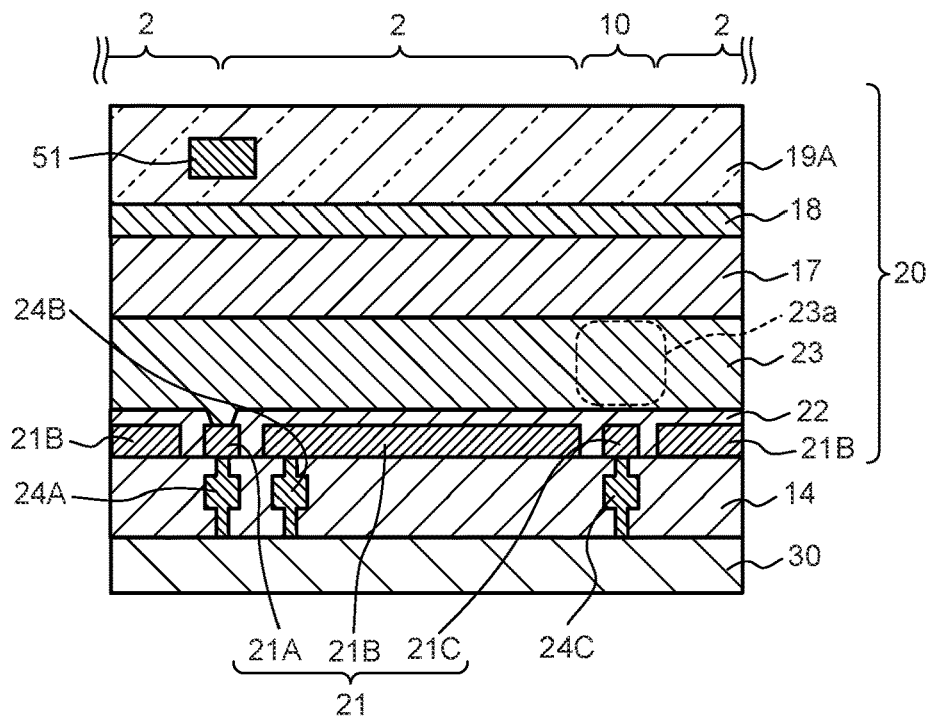
FIG. 16 is a cross-sectional view schematically illustrating a configuration of an organic photoelectric conversion section according to a fourth modification of the embodiment of the present disclosure.
Figure 17:
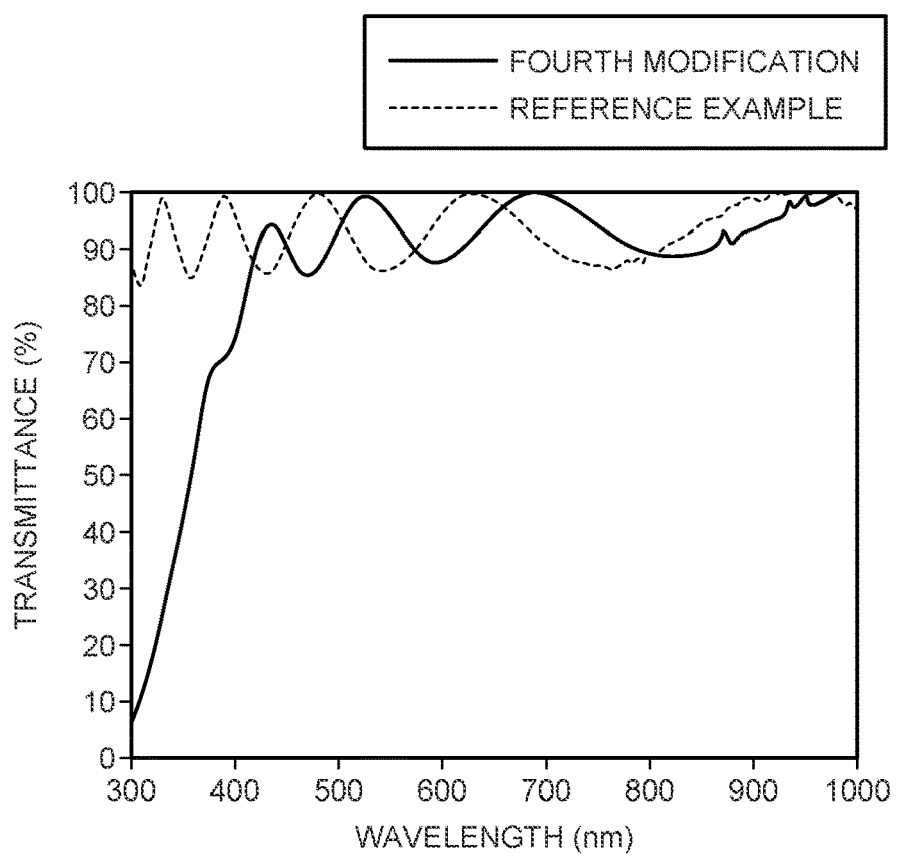
FIG. 17 is a diagram illustrating the wavelength dependency of an absorption rate in a protective layer of each of the fourth modification of the embodiment of the present disclosure and a reference example.

FIG. 16 is a cross-sectional view schematically illustrating a configuration of an organic photoelectric conversion section 20 according to the fourth modification of the embodiment of the present disclosure, and FIG. 17 is a view illustrating wavelength dependency of an absorption rate in a protective layer of each of the fourth modification of the embodiment of the present disclosure and a reference example.

In the organic photoelectric conversion section 20 of the fourth modification, the optical characteristics of a protective layer 19A are different from those of the first modification. Specifically, in the fourth modification, the protective layer 19A is made of a protective film (for example, low-temperature deposited CVD-SiN) having a high absorption rate in the ultraviolet wavelength region. The protective layer 19A is another example of the light shielding section.

As illustrated in FIG. 17, the protective layer 19A composed of the CVD-SiN deposited at a low temperature has a higher absorption rate in the ultraviolet wavelength region than the protective layer 19 (here, a CVD-SiN deposited at a high temperature is used) of the reference example. This makes it is possible to suppress incidence of ultraviolet light having high light energy on the charge storage layer 23a located in the isolation region 10.

That is, in the fourth modification, as in the embodiment, it is possible to suppress a change in the potential of the charge storage layer 23a to which the bias voltage is applied due to the incidence of light. Therefore, according to the fourth modification, the occurrence of blooming, color mixing, or the like between the adjacent light receiving pixels 2 can be suppressed, so that the imaging image quality of the organic photoelectric conversion section 20 can be improved.

<Fifth Modification>

In the embodiment and various modifications described so far, the case where the light receiving pixel 2 is a vertical spectroscopic pixel in which one layer of the organic photoelectric conversion section 20 and two layers of the inorganic photoelectric conversion sections 32B and 32R are stacked in the vertical direction is described, but the configuration of the light receiving pixel 2 is not limited to such an example.

Figure 18:
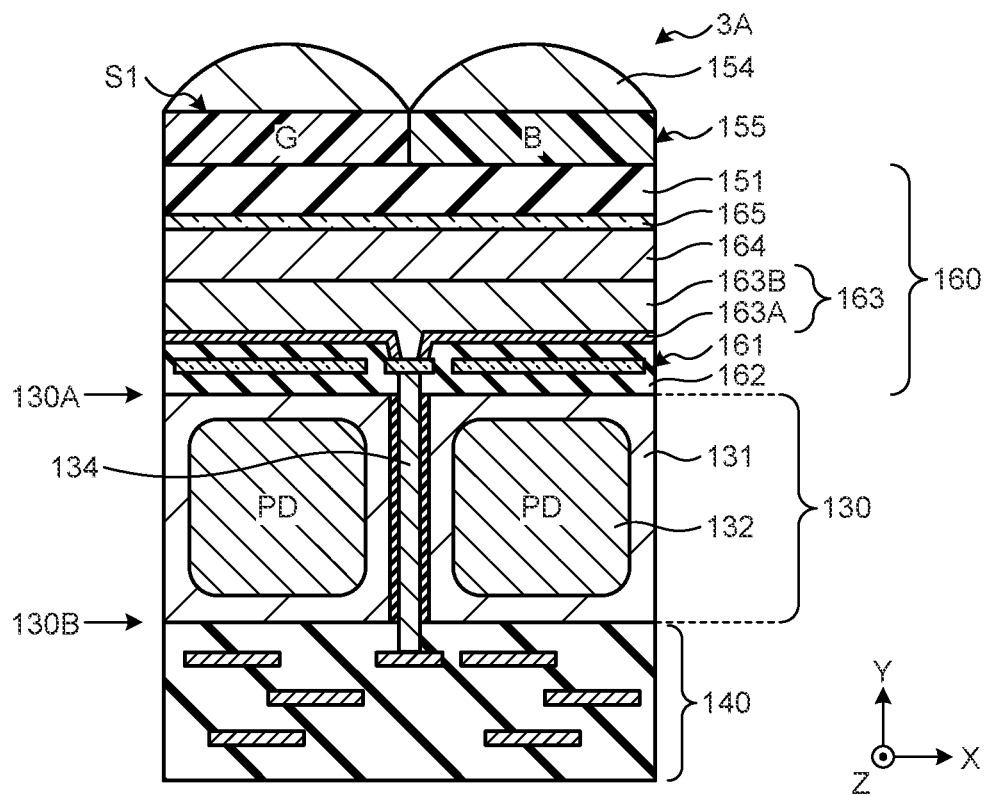
FIG. 18 is a cross-sectional view schematically illustrating a configuration of each photoelectric conversion section according to a fifth modification of the embodiment of the present disclosure.
Figure 19:
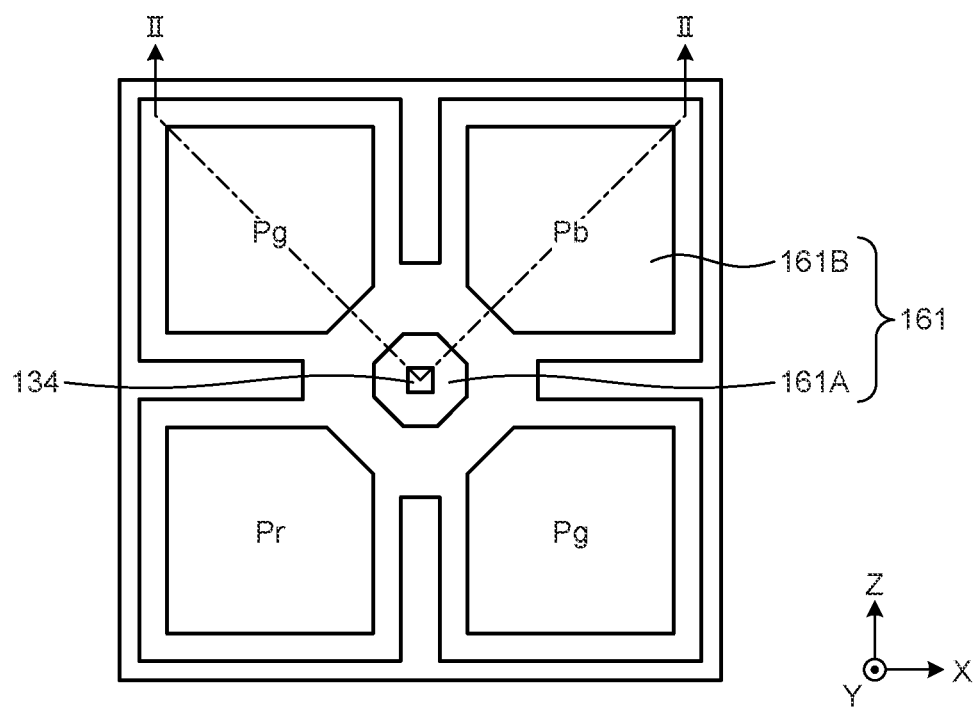
FIG. 19 is a plan view schematically illustrating a configuration of each photoelectric conversion section according to the fifth modification of the embodiment of the present disclosure.

FIG. 18 is a cross-sectional view schematically illustrating a configuration of each photoelectric conversion section according to the fifth modification of the embodiment of the present disclosure, and FIG. 19 is a plan view schematically illustrating a configuration of each photoelectric conversion section according to the fifth modification of the embodiment of the present disclosure. FIG. 18 illustrates a cross section taken along line II-II illustrated in FIG. 19.

A pixel array section 3A according to the fifth modification is, for example, a stacked pixel array section in which one layer of an organic photoelectric conversion section 160 and one layer of an inorganic photoelectric conversion section 132 are stacked in the vertical direction. In the fifth modification, as illustrated in FIG. 19, for example, four pixels disposed in 2 rows×2 columns form one pixel unit, and are repeatedly disposed in an array in the row direction and the column direction.

In the pixel array section 3A according to the fifth modification, a color filter 155 that selectively transmits red (R), green (G), and blue (B) is provided on the organic photoelectric conversion section 160 (light incident side S1) for each unit pixel.

Specifically, in a pixel unit including four pixels disposed in two rows×two columns, two color filters that selectively transmit green light are disposed on a diagonal line, and color filters that selectively transmits respective red light and blue light are disposed one by one on an orthogonal diagonal line.

In the unit pixels Pr, Pg, and Pb provided with the red, green, and blue color filters, for example, light of corresponding colors is detected in the organic photoelectric conversion section 160. That is, in the pixel array section 3A according to the fifth modification, the pixels Pr, Pg, and Pb that detect red light, green light, and blue light, respectively, are disposed in a Bayer pattern.

As illustrated in FIG. 18, the organic photoelectric conversion section 160 of the fifth modification includes, for example, a lower electrode 161, an insulating layer 162, a charge storage layer 163, a photoelectric conversion layer 164, and an upper electrode 165. The organic photoelectric conversion section 160 of the fifth modification has the same configuration as the organic photoelectric conversion section 20 of the second modification including a photoelectric conversion layer which is a panchromatic film. The inorganic photoelectric conversion section 132 detects light in a wavelength region different from that of the organic photoelectric conversion section 160.

In the pixel array section 3A of the fifth modification, among the light transmitted through the color filters 155, the light in the visible light region (red light (R), green light (G) and blue light (B)) is absorbed by the organic photoelectric conversion sections 60 of the unit pixels Pr, Pg, and Pb provided with the respective color filters.

In addition, light in other wavelength regions, for example, infrared light in an infrared wavelength region (for example, 700 nm or more and 1000 nm or less) passes through the organic photoelectric conversion section 160. The infrared light transmitted through the organic photoelectric conversion section 160 is detected by the inorganic photoelectric conversion section 132 of each of the unit pixels Pr, Pg, and Pb, and the signal charge corresponding to the infrared light are also generated in each of the unit pixels Pr, Pg, and Pb.

That is, in the solid-state imaging element 1 including the pixel array section 3A according to the fifth modification, both the visible light image and the infrared light image can be simultaneously generated.

Then, in the pixel array section 3A according to the fifth modification, as in the embodiment and the like, a light shielding section (for example, metal film 25, photoelectric conversion layer 17A, upper electrode 18A, and protective layer 19A) that suppresses incidence of light on the charge storage layer 163 located in the isolation region 10 (see FIG. 5) is provided. As a result, it is possible to suppress a change in the potential of the charge storage layer 163 that is located in the isolation region 10 and to which the bias voltage is applied due to incidence of light.

Therefore, according to the fifth modification, the occurrence of blooming, color mixing, or the like between the adjacent pixels can be suppressed, so that the imaging image quality of the organic photoelectric conversion section 160 can be improved.

<Sixth Modification>

In the fifth modification described above, an example is described in which the color filter 155 that selectively transmits red light, green light, and blue light is provided on the organic photoelectric conversion section 160 (light incident side S1). However, as illustrated in FIG. 20, the color filter 155 may be provided, for example, between the inorganic photoelectric conversion section 132 and the organic photoelectric conversion section 160.

Figure 20:
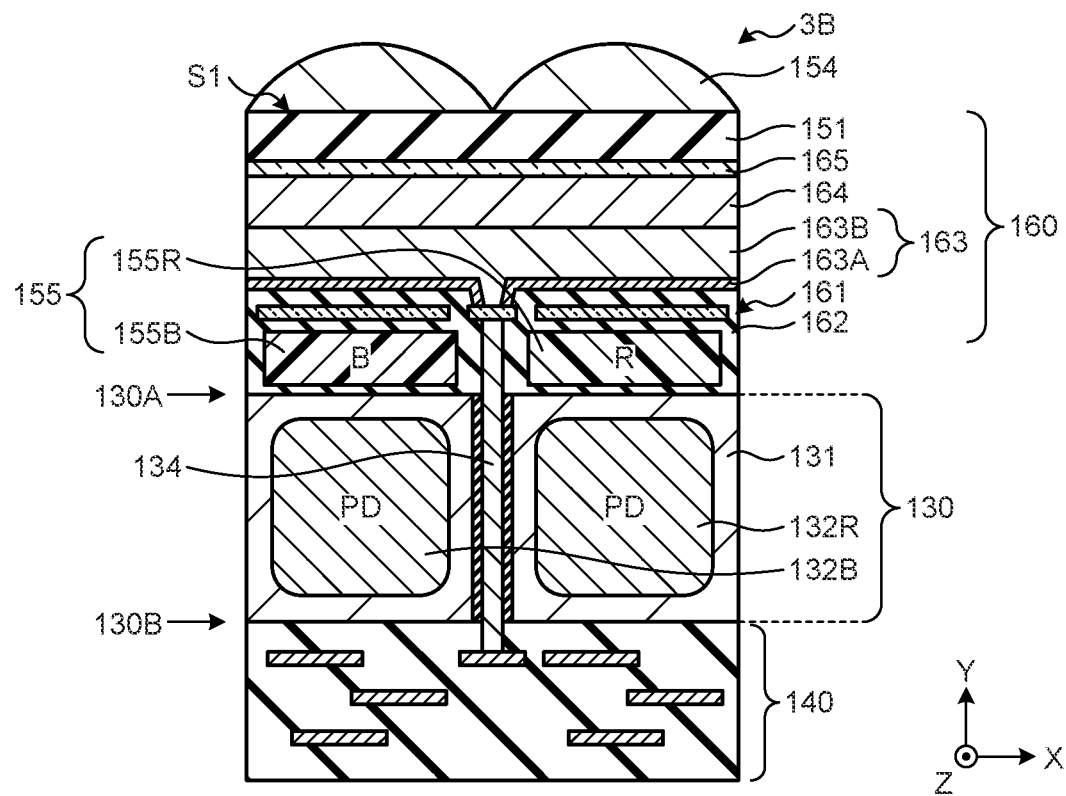
FIG. 20 is a cross-sectional view schematically illustrating a configuration of each photoelectric conversion section according to a sixth modification of the embodiment of the present disclosure.
Figure 21:
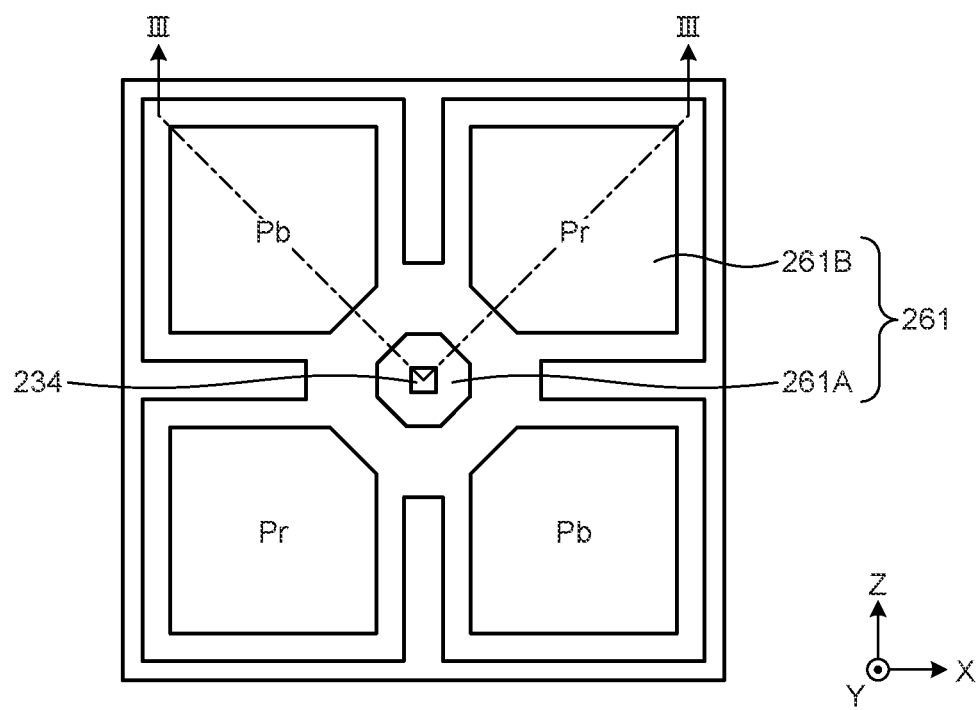
FIG. 21 is a plan view schematically illustrating a configuration of each photoelectric conversion section according to the sixth modification of the embodiment of the present disclosure.

FIG. 20 is a cross-sectional view schematically illustrating a configuration of each photoelectric conversion section according to the sixth modification of the embodiment of the present disclosure, and FIG. 21 is a plan view schematically illustrating a configuration of each photoelectric conversion section according to the sixth modification of the embodiment of the present disclosure. FIG. 20 illustrates a cross section taken along line III-III illustrated in FIG. 21.

In a pixel array section 3B according to the sixth modification, for example, the color filter 155 has a configuration in which a color filter 155R that selectively transmits red light and a color filter 155B that selectively transmits blue light are disposed diagonally to each other in the pixel unit.

Then, the organic photoelectric conversion section 160 (photoelectric conversion layer 164) of the sixth modification is configured to selectively absorb a wavelength corresponding to green light, for example. That is, in the pixel array section 3B according to the sixth modification, the organic photoelectric conversion section 160 and the inorganic photoelectric conversion sections 132R and 132B disposed below the color filters 155R and 155B can acquire signals corresponding to RGB.

In the pixel array section 3B according to the sixth modification, since the area of each of the photoelectric conversion section of each RGB can be enlarged as compared with that in a pixel array section having a general Bayer array, the S/N ratio can be improved.

Then, in the pixel array section 3B according to the sixth modification, as in the embodiment and the like, a light shielding section (for example, metal film 25, upper electrode 18A, and protective layer 19A) that suppresses incidence of light on the charge storage layer 163 located in the isolation region 10 (see FIG. 5) is provided. As a result, it is possible to suppress a change in the potential of the charge storage layer 163 that is located in the isolation region 10 and to which the bias voltage is applied due to incidence of light.

Therefore, according to the sixth modification, the occurrence of blooming, color mixing, or the like between the adjacent pixels can be suppressed, so that the imaging image quality of the organic photoelectric conversion section 160 can be improved.

[Effects]

The solid-state imaging element 1 according to the embodiment includes the pixel array section 3, the isolation region 10, and the light shielding section (metal film 25, photoelectric conversion layer 17A, upper electrode 18A, protective layer 19A). In the pixel array section 3, a plurality of light receiving pixels 2 including the photoelectric conversion layer 17 (17A) made of an organic material and the charge storage layer 23 that stores a charge generated in the photoelectric conversion layer 17 (17A) are disposed side by side. The isolation region 10 is provided between the light receiving pixels 2 adjacent to each other in the pixel array section 3. The light shielding section (metal film 25, photoelectric conversion layer 17A, upper electrode 18A, protective layer 19A) suppresses incidence of light on the charge storage layer 23a located in the isolation region 10.

As a result, the imaging image quality of the organic photoelectric conversion section 20 can be improved.

Furthermore, in the solid-state imaging element 1 according to the embodiment, the light shielding section is the metal film 25 located in the isolation region 10 and provided closer to the light incident side than the charge storage layer 23a.

As a result, it is possible to suppress incidence of light in a wide wavelength region on the charge storage layer 23a of the isolation region 10, so that the imaging image quality of the organic photoelectric conversion section 20 can be further improved.

Furthermore, in the solid-state imaging element 1 according to the embodiment, the photoelectric conversion layer 17A is provided closer to the light incident side than the charge storage layer 23. The light shielding section is the photoelectric conversion layer 17A located in the isolation region 10.

As a result, the imaging image quality of the organic photoelectric conversion section 20 can be improved.

Furthermore, in the solid-state imaging element 1 according to the embodiment, the light receiving pixel 2 further includes an electrode layer (upper electrode 18A) provided closer to the light incident side than the photoelectric conversion layer 17 and the charge storage layer 23. The light shielding section is an electrode layer (upper electrode 18A) located in the isolation region 10.

As a result, the imaging image quality of the organic photoelectric conversion section 20 can be improved.

Furthermore, in the solid-state imaging element 1 according to the embodiment, the light receiving pixel 2 further includes the protective layer 19A provided closer to the light incident side than the photoelectric conversion layer 17 and the charge storage layer 23. The light shielding section is the protective layer 19A located in the isolation region 10.

As a result, the imaging image quality of the organic photoelectric conversion section 20 can be improved.

Furthermore, in the solid-state imaging element 1 according to the embodiment, the light shielding section (metal film 25, photoelectric conversion layer 17A, upper electrode 18A, protective layer 19A) suppresses transmission of light having a wavelength shorter than that in the green wavelength region.

As a result, the imaging image quality of the organic photoelectric conversion section 20 can be improved.

Furthermore, the solid-state imaging element 1 according to the embodiment further includes the shield electrode 21C that applies a bias voltage to the charge storage layer 23a located in the isolation region 10.

As a result, the imaging image quality of the organic photoelectric conversion section 20 can be improved.

[Electronic Device]

Note that the present disclosure is not limited to application to a solid-state imaging element. That is, the present disclosure is applicable to all electronic devices having a solid-state imaging element, such as a camera module, an imaging device, a mobile terminal device having an imaging function, or a copying machine including a solid-state imaging element in an image reading section, in addition to the solid-state imaging element.

Examples of such an imaging device include a digital still camera and a video camera. Examples of the mobile terminal device having such an imaging function include a smartphone and a tablet terminal.

Figure 22:
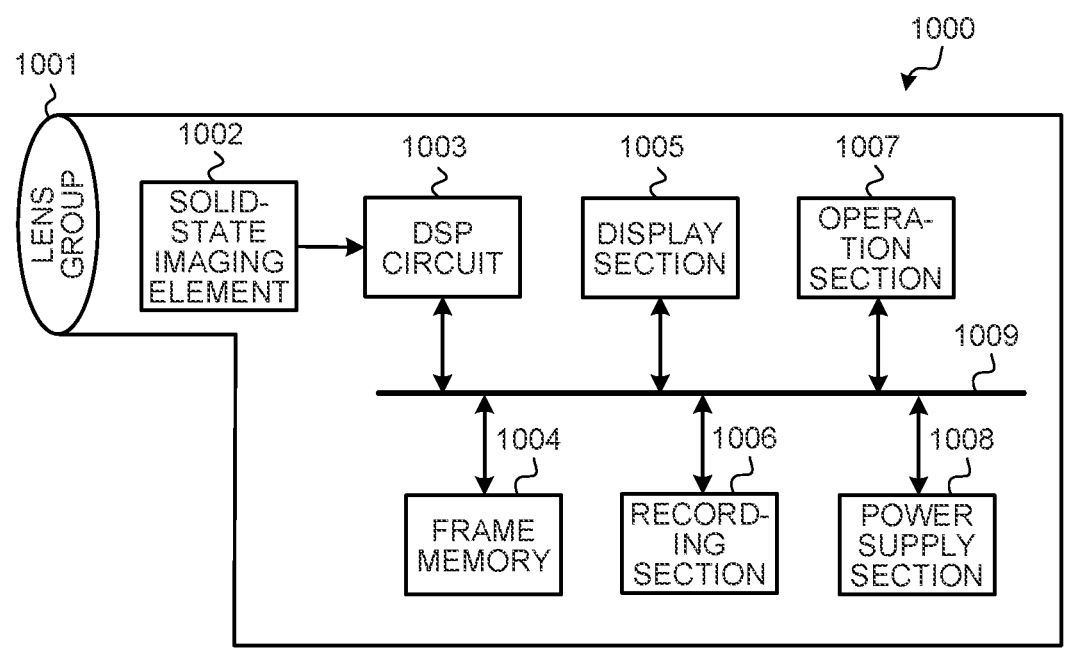
FIG. 22 is a block diagram illustrating a configuration example of an imaging device as an electronic device to which the technology according to the present disclosure is applied.

FIG. 22 is a block diagram illustrating a configuration example of an imaging device as an electronic device 1000 to which the technology according to the present disclosure is applied. The electronic device 1000 in FIG. 22 is, for example, an electronic device such as an imaging device such as a digital still camera or a video camera, or a mobile terminal device such as a smartphone or a tablet terminal.

In FIG. 22, the electronic device 1000 includes a lens group 1001, a solid-state imaging element 1002, a DSP circuit 1003, a frame memory 1004, a display section 1005, a recording section 1006, an operation section 1007, and a power supply section 1008.

Furthermore, in the electronic device 1000, the DSP circuit 1003, the frame memory 1004, the display section 1005, the recording section 1006, the operation section 1007, and the power supply section 1008 are mutually connected via a bus line 1009.

The lens group 1001 captures incident light (image light) from a subject and forms an image on an imaging surface of the solid-state imaging element 1002. The solid-state imaging element 1002 corresponds to the solid-state imaging element 1 according to the above-described embodiment, and converts the amount of incident light imaged on the imaging surface by the lens group 1001 into an electrical signal for each pixel to output the electric signal as a pixel signal.

The DSP circuit 1003 is a camera signal processing circuit that processes a signal supplied from the solid-state imaging element 1002. The frame memory 1004 temporarily holds the image data processed by the DSP circuit 1003 in unit of the frame.

The display section 1005 includes, for example, a panel type display apparatus such as a liquid crystal panel or an organic electro luminescence (EL) panel, and displays a moving image or a still image captured by the solid-state imaging element 1002. The recording section 1006 records image data of a moving image or a still image captured by the solid-state imaging element 1002 on a recording medium such as a semiconductor memory or a hard disk.

The operation section 1007 issues operation commands for various functions of the electronic device 1000 in accordance with an operation by a user. The power supply section 1008 appropriately supplies various power supplies serving as operation power supplies of the DSP circuit 1003, the frame memory 1004, the display section 1005, the recording section 1006, and the operation section 1007 to these supply targets.

In the electronic device 1000 configured as described above, by applying the solid-state imaging element 1 of each of the above-described embodiments as the solid-state imaging element 1002, it is possible to improve the imaging image quality of the organic photoelectric conversion section 20.

[Example of Application to Mobile Body]

The technology according to the present disclosure (the present technology) can be applied to various products. For example, the technology according to the present disclosure may be further applied to a device mounted on any of various mobile bodies such as automobiles, electric vehicles, hybrid electric vehicles, motorcycles, bicycles, personal mobility, airplanes, drones, ships, and robots.

Figure 23:
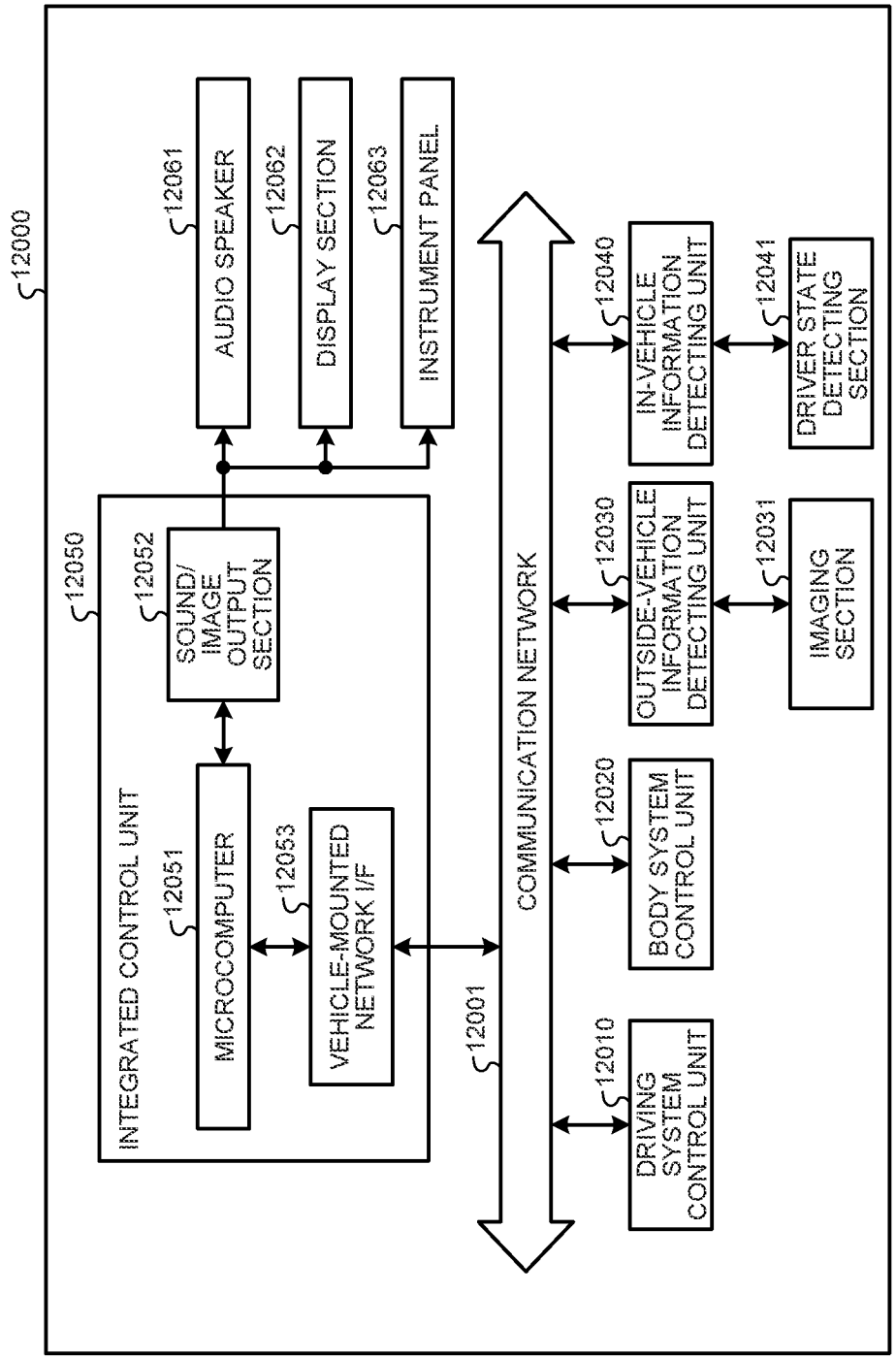
FIG. 23 is a block diagram depicting an example of schematic configuration of a vehicle control system.

FIG. 23 is a block diagram depicting an example of schematic configuration of a vehicle control system as an example of a mobile body control system to which the technology according to an embodiment of the present disclosure can be applied.

A vehicle control system 12000 includes a plurality of electronic control units connected to each other via a communication network 12001. In the example depicted in FIG. 23, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 23, an audio speaker 12061, a display section 12062, and an instrument panel 12063 are illustrated as the output device. The display section 12062 may, for example, include at least one of an on-board display and a head-up display.

Figure 24:
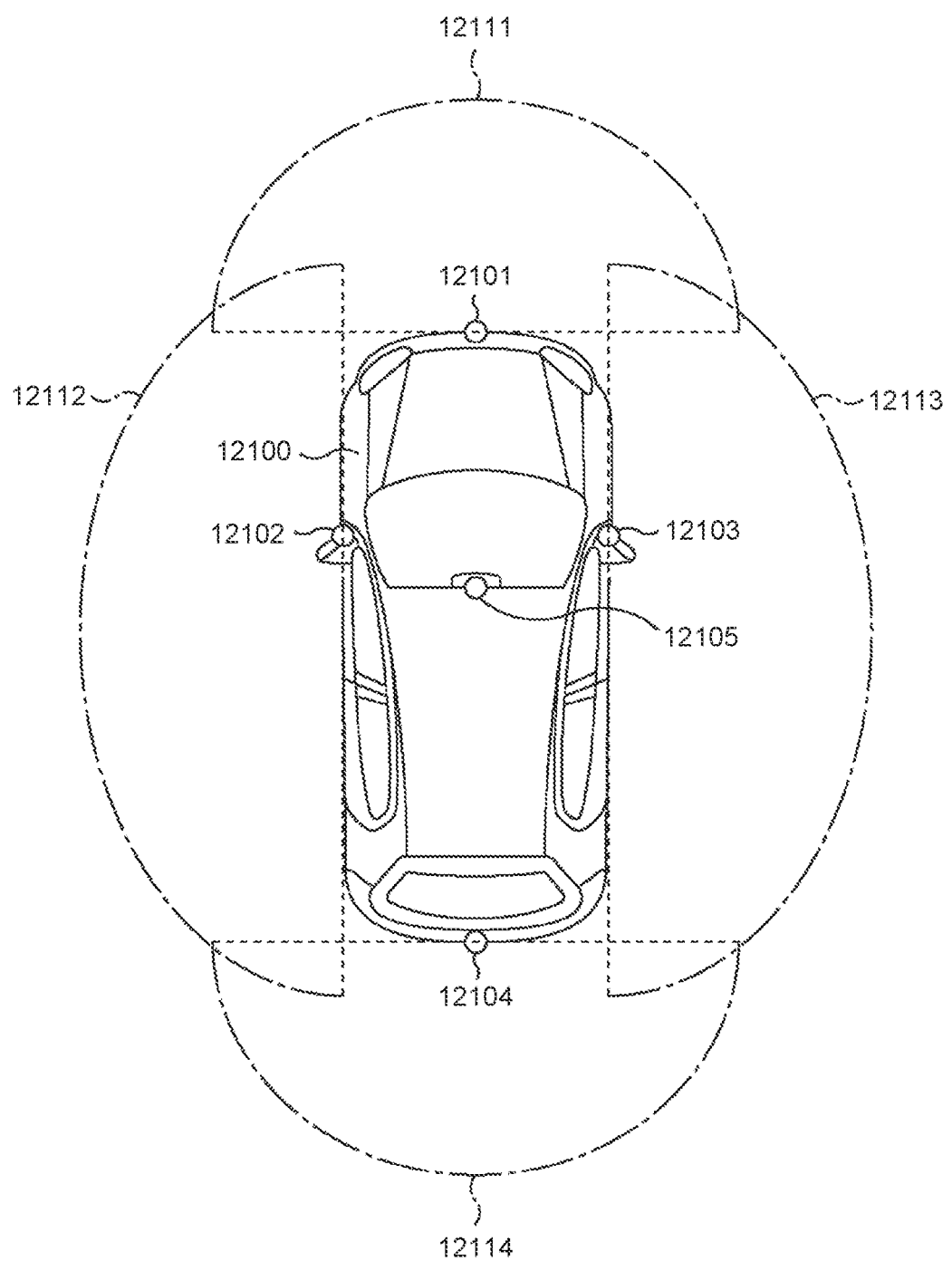
FIG. 24 is a diagram of assistance in explaining an example of installation positions of an outside-vehicle information detecting section and an imaging section.

FIG. 24 is a diagram depicting an example of the installation position of the imaging section 12031.

In FIG. 24, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of a vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 24 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technique according to the present disclosure can be applied is described above. The technique according to the present disclosure can be applied to the imaging section 12031 of the configuration described above. Specifically, the solid-state imaging element 1 in FIG. 1 can be applied to the imaging section 12031. By applying the technology according to the present disclosure to the imaging section 12031, a high-quality image can be acquired from the imaging section 12031.

[Example of Application to Endoscopic Surgery System]

The technology according to the present disclosure (the present technology) can be applied to various products. For example, the technology according to the present disclosure may be applied to an endoscopic surgery system.

Figure 25:
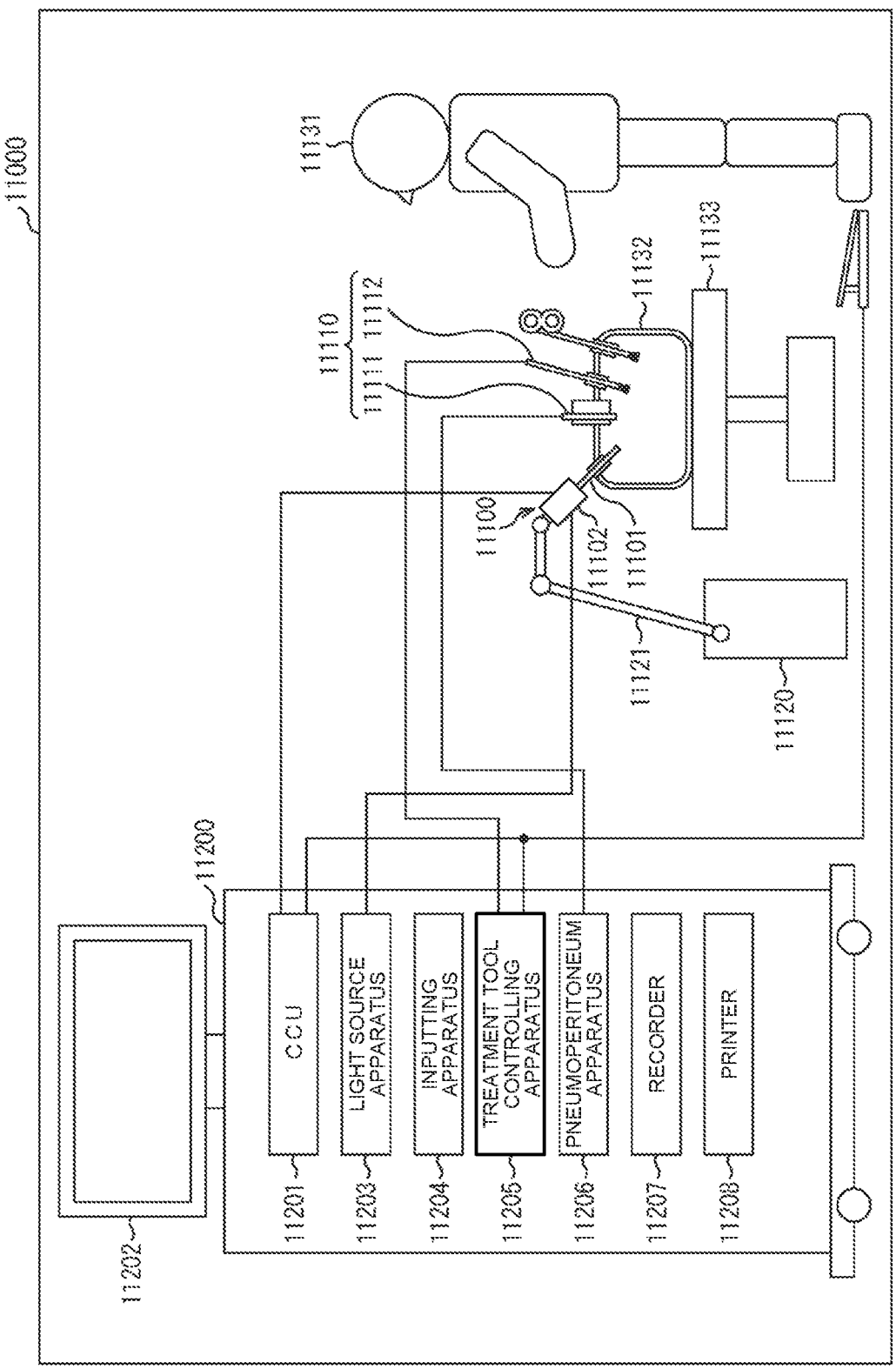
FIG. 25 is a view depicting an example of a schematic configuration of an endoscopic surgery system.

FIG. 25 is a view depicting an example of a schematic configuration of an endoscopic surgery system to which the technology according to an embodiment of the present disclosure (present technology) can be applied.

In FIG. 25, a state is illustrated in which a surgeon (medical doctor) 11131 is using an endoscopic surgery system 11000 to perform surgery for a patient 11132 on a patient bed 11133. As depicted, the endoscopic surgery system 11000 includes an endoscope 11100, other surgical tools 11110 such as a pneumoperitoneum tube 11111 and an energy treatment tool 11112, a supporting arm apparatus 11120 which supports the endoscope 11100 thereon, and a cart 11200 on which various apparatus for endoscopic surgery are mounted.

The endoscope 11100 includes a lens barrel 11101 having a region of a predetermined length from a distal end thereof to be inserted into a body lumen of the patient 11132, and a camera head 11102 connected to a proximal end of the lens barrel 11101. In the example depicted, the endoscope 11100 is depicted which includes as a hard mirror having the lens barrel 11101 of the hard type. However, the endoscope 11100 may otherwise be included as a soft mirror having the lens barrel 11101 of the soft type.

The lens barrel 11101 has, at a distal end thereof, an opening in which an objective lens is fitted. A light source apparatus 11203 is connected to the endoscope 11100 such that light generated by the light source apparatus 11203 is introduced to a distal end of the lens barrel 11101 by a light guide extending in the inside of the lens barrel 11101 and is irradiated toward an observation target in a body lumen of the patient 11132 through the objective lens. It is to be noted that the endoscope 11100 may be a direct view mirror or may be a perspective view mirror or a side view mirror.

An optical system and an image pickup element are provided in the inside of the camera head 11102 such that reflected light (observation light) from the observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 11201.

The CCU 11201 includes a central processing unit (CPU), a graphics processing unit (GPU) or the like and integrally controls operation of the endoscope 11100 and a display apparatus 11202. Further, the CCU 11201 receives an image signal from the camera head 11102 and performs, for the image signal, various image processes for displaying an image based on the image signal such as, for example, a development process (demosaic process).

The display apparatus 11202 displays thereon an image based on an image signal, for which the image processes have been performed by the CCU 11201, under the control of the CCU 11201.

The light source apparatus 11203 includes a light source such as, for example, a light emitting diode (LED) and supplies irradiation light upon imaging of a surgical region to the endoscope 11100.

An inputting apparatus 11204 is an input interface for the endoscopic surgery system 11000. A user can perform inputting of various kinds of information or instruction inputting to the endoscopic surgery system 11000 through the inputting apparatus 11204. For example, the user would input an instruction or a like to change an image pickup condition (type of irradiation light, magnification, focal distance or the like) by the endoscope 11100.

A treatment tool controlling apparatus 11205 controls driving of the energy treatment tool 11112 for cautery or incision of a tissue, sealing of a blood vessel or the like. A pneumoperitoneum apparatus 11206 feeds gas into a body lumen of the patient 11132 through the pneumoperitoneum tube 11111 to inflate the body lumen in order to secure the field of view of the endoscope 11100 and secure the working space for the surgeon. A recorder 11207 is an apparatus capable of recording various kinds of information relating to surgery. A printer 11208 is an apparatus capable of printing various kinds of information relating to surgery in various forms such as a text, an image or a graph.

It is to be noted that the light source apparatus 11203 which supplies irradiation light when a surgical region is to be imaged to the endoscope 11100 may include a white light source which includes, for example, an LED, a laser light source or a combination of them. Where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 11203. Further, in this case, if laser beams from the respective RGB laser light sources are irradiated time-divisionally on an observation target and driving of the image pickup elements of the camera head 11102 are controlled in synchronism with the irradiation timings. Then images individually corresponding to the R, G and B colors can be also picked up time-divisionally. According to this method, a color image can be obtained even if color filters are not provided for the image pickup element.

Further, the light source apparatus 11203 may be controlled such that the intensity of light to be outputted is changed for each predetermined time. By controlling driving of the image pickup element of the camera head 11102 in synchronism with the timing of the change of the intensity of light to acquire images time-divisionally and synthesizing the images, an image of a high dynamic range free from underexposed blocked up shadows and overexposed highlights can be created.

Further, the light source apparatus 11203 may be configured to supply light of a predetermined wavelength band ready for special light observation. In special light observation, for example, by utilizing the wavelength dependency of absorption of light in a body tissue to irradiate light of a narrow band in comparison with irradiation light upon ordinary observation (namely, white light), narrow band observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 11203 can be configured to supply such narrow-band light and/or excitation light suitable for special light observation as described above.

Figure 26:
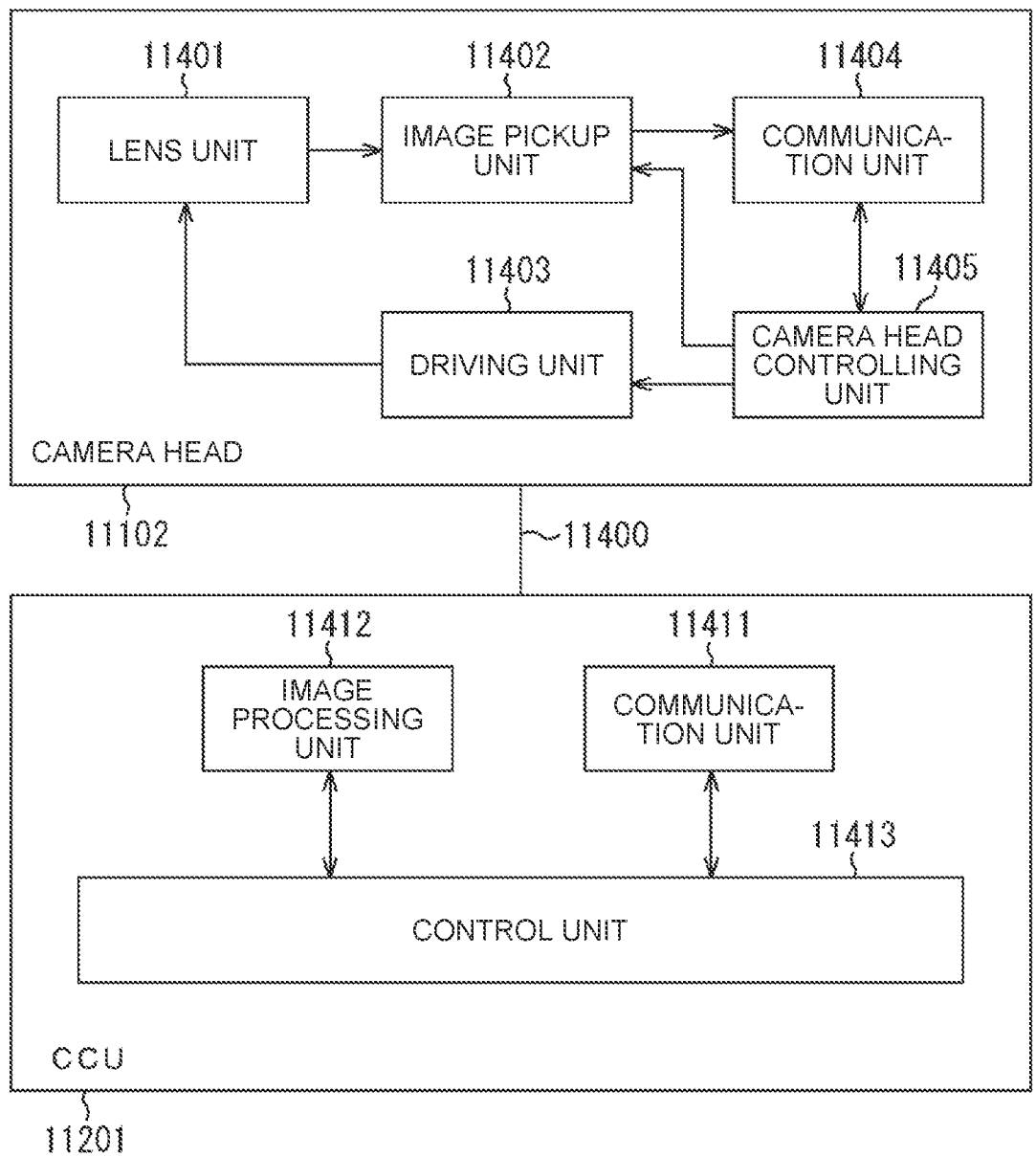
FIG. 26 is a block diagram depicting an example of a functional configuration of a camera head and a camera control unit (CCU).

FIG. 26 is a block diagram depicting an example of a functional configuration of the camera head 11102 and the CCU 11201 depicted in FIG. 25.

The camera head 11102 includes a lens unit 11401, an image pickup unit 11402, a driving unit 11403, a communication unit 11404 and a camera head controlling unit 11405. The CCU 11201 includes a communication unit 11411, an image processing unit 11412 and a control unit 11413. The camera head 11102 and the CCU 11201 are connected for communication to each other by a transmission cable 11400.

The lens unit 11401 is an optical system, provided at a connecting location to the lens barrel 11101. Observation light taken in from a distal end of the lens barrel 11101 is guided to the camera head 11102 and introduced into the lens unit 11401. The lens unit 11401 includes a combination of a plurality of lenses including a zoom lens and a focusing lens.

The number of image pickup elements which is included by the image pickup unit 11402 may be one (single-plate type) or a plural number (multi-plate type). Where the image pickup unit 11402 is configured as that of the multi-plate type, for example, image signals corresponding to respective R, G and B are generated by the image pickup elements, and the image signals may be synthesized to obtain a color image. The image pickup unit 11402 may also be configured so as to have a pair of image pickup elements for acquiring respective image signals for the right eye and the left eye ready for three dimensional (3D) display. If 3D display is performed, then the depth of a living body tissue in a surgical region can be comprehended more accurately by the surgeon 11131. It is to be noted that, where the image pickup unit 11402 is configured as that of stereoscopic type, a plurality of systems of lens units 11401 are provided correspondingly to the individual image pickup elements.

Further, the image pickup unit 11402 may not necessarily be provided on the camera head 11102. For example, the image pickup unit 11402 may be provided immediately behind the objective lens in the inside of the lens barrel 11101.

The driving unit 11403 includes an actuator and moves the zoom lens and the focusing lens of the lens unit 11401 by a predetermined distance along an optical axis under the control of the camera head controlling unit 11405. Consequently, the magnification and the focal point of a picked up image by the image pickup unit 11402 can be adjusted suitably.

The communication unit 11404 includes a communication apparatus for transmitting and receiving various kinds of information to and from the CCU 11201. The communication unit 11404 transmits an image signal acquired from the image pickup unit 11402 as RAW data to the CCU 11201 through the transmission cable 11400.

In addition, the communication unit 11404 receives a control signal for controlling driving of the camera head 11102 from the CCU 11201 and supplies the control signal to the camera head controlling unit 11405. The control signal includes information relating to image pickup conditions such as, for example, information that a frame rate of a picked up image is designated, information that an exposure value upon image picking up is designated and/or information that a magnification and a focal point of a picked up image are designated.

It is to be noted that the image pickup conditions such as the frame rate, exposure value, magnification or focal point may be designated by the user or may be set automatically by the control unit 11413 of the CCU 11201 on the basis of an acquired image signal. In the latter case, an auto exposure (AE) function, an auto focus (AF) function and an auto white balance (AWB) function are incorporated in the endoscope 11100.

The camera head controlling unit 11405 controls driving of the camera head 11102 on the basis of a control signal from the CCU 11201 received through the communication unit 11404.

The communication unit 11411 includes a communication apparatus for transmitting and receiving various kinds of information to and from the camera head 11102. The communication unit 11411 receives an image signal transmitted thereto from the camera head 11102 through the transmission cable 11400.

Further, the communication unit 11411 transmits a control signal for controlling driving of the camera head 11102 to the camera head 11102. The image signal and the control signal can be transmitted by electrical communication, optical communication or the like.

The image processing unit 11412 performs various image processes for an image signal in the form of RAW data transmitted thereto from the camera head 11102.

The control unit 11413 performs various kinds of control relating to image picking up of a surgical region or the like by the endoscope 11100 and display of a picked up image obtained by image picking up of the surgical region or the like. For example, the control unit 11413 creates a control signal for controlling driving of the camera head 11102.

Further, the control unit 11413 controls, on the basis of an image signal for which image processes have been performed by the image processing unit 11412, the display apparatus 11202 to display a picked up image in which the surgical region or the like is imaged. Thereupon, the control unit 11413 may recognize various objects in the picked up image using various image recognition technologies. For example, the control unit 11413 can recognize a surgical tool such as forceps, a particular living body region, bleeding, mist when the energy treatment tool 11112 is used and so forth by detecting the shape, color and so forth of edges of objects included in a picked up image. The control unit 11413 may cause, when it controls the display apparatus 11202 to display a picked up image, various kinds of surgery supporting information to be displayed in an overlapping manner with an image of the surgical region using a result of the recognition. Where surgery supporting information is displayed in an overlapping manner and presented to the surgeon 11131, the burden on the surgeon 11131 can be reduced and the surgeon 11131 can proceed with the surgery with certainty.

The transmission cable 11400 which connects the camera head 11102 and the CCU 11201 to each other is an electric signal cable ready for communication of an electric signal, an optical fiber ready for optical communication or a composite cable ready for both of electrical and optical communications.

Here, while, in the example depicted, communication is performed by wired communication using the transmission cable 11400, the communication between the camera head 11102 and the CCU 11201 may be performed by wireless communication.

An example of the endoscopic surgery system to which the technique according to the present disclosure can be applied is described above. The technique according to the present disclosure can be applied to the image pickup unit 11402 of the camera head 11102 of the configuration described above. Specifically, the solid-state imaging element 1 in FIG. 1 can be applied to the image pickup unit 11402. By applying the technology according to the present disclosure to the image pickup unit 11402, a high-quality surgical site image can be obtained from the image pickup unit 11402, so that the surgeon can reliably confirm the surgical site.

Note that, here, the endoscopic surgery system is described as an example, but the technology according to the present disclosure may be applied to, for example, a microscopic surgery system or the like.

The embodiments of the present disclosure have been described above, the technical scope of the present disclosure is not limited to the above-described embodiments as they are, and various changes can be made without departing from the gist of the present disclosure. Moreover, the components over different embodiments and modifications may be suitably combined.

Further, the effects in each embodiment described in the present specification are merely examples and are not limited, and other effects may be present.

The present technology may also be configured as below.

(1)

A solid-state imaging element comprising:

a pixel array section in which a plurality of light receiving pixels each including a photoelectric conversion layer made of an organic material and a charge storage layer that stores a charge generated in the photoelectric conversion layer is disposed side by side;

an isolation region provided between the light receiving pixels adjacent to each other in the pixel array section; and a light shielding section that suppresses incidence of light on the charge storage layer located in the isolation region.

(2)

The solid-state imaging element according to the above (1), wherein the light shielding section is a metal film located in the isolation region and provided closer to a light incident side than the charge storage layer.

(3)

The solid-state imaging element according to the above (1) or (2), wherein the photoelectric conversion layer is provided closer to a light incident side than the charge storage layer, and the light shielding section is the photoelectric conversion layer located in the isolation region.

(4)

The solid-state imaging element according to any one of the above (1) to (3), wherein the light receiving pixel further includes an electrode layer provided closer to a light incident side than the photoelectric conversion layer and the charge storage layer, and the light shielding section is the electrode layer located in the isolation region.

(5)

The solid-state imaging element according to any one of the above (1) to (4), wherein the light receiving pixel further includes a protective layer provided closer to a light incident side than the photoelectric conversion layer and the charge storage layer, and the light shielding section is the protective layer located in the isolation region.

(6)

The solid-state imaging element according to any one of the above (1) to (5), wherein
the light shielding section suppresses transmission of light having a wavelength shorter than a wavelength in a green wavelength region.

(7)

The solid-state imaging element according to any one of the above (1) to (6), further comprising:
a shield electrode that applies a bias voltage to the charge storage layer located in the isolation region.

(8)

An electronic device comprising:
a solid-state imaging element;
an optical system that captures incident light from a subject and that forms an image on an imaging surface of the solid-state imaging element; and
a signal processing circuit that performs a process on an output signal from the solid-state imaging element, wherein
the solid-state imaging element includes
a pixel array section in which a plurality of light receiving pixels each including a photoelectric conversion layer made of an organic material and a charge storage layer that stores a charge generated in the photoelectric conversion layer is disposed side by side,
an isolation region provided between light receiving pixels adjacent to each other in the pixel array section, and
a light shielding section that suppresses incidence of light on the charge storage layer located in the isolation region.

(9)

The solid-state imaging element according to the above (8), in which
the light shielding section is a metal film located in the isolation region and provided closer to a light incident side than the charge storage layer.

(10)

The solid-state imaging element according to the above (8) or (9), in which
the photoelectric conversion layer is provided closer to a light incident side than the charge storage layer, and
the light shielding section is the photoelectric conversion layer located in the isolation region.

(11)

The solid-state imaging element according to any one of the above (8) to (10), in which
the light receiving pixel further includes an electrode layer provided closer to a light incident side than the photoelectric conversion layer and the charge storage layer, and
the light shielding section is the electrode layer located in the isolation region.

(12)

The solid-state imaging element according to any one of the above (8) to (11), in which
the light receiving pixel further includes a protective layer provided closer to a light incident side than the photoelectric conversion layer and the charge storage layer, and
the light shielding section is the protective layer located in the isolation region.

(13)

The solid-state imaging element according to any one of the above (8) to (12), in which
the light shielding section suppresses transmission of light having a wavelength shorter than a wavelength in a green wavelength region.

(14)

The solid-state imaging element according to any one of the above (8) to (13), further including
a shield electrode that applies a bias voltage to the charge storage layer located in the isolation region.

REFERENCE SIGNS LIST

1 SOLID-STATE IMAGING ELEMENT
2 LIGHT RECEIVING PIXEL
3, 3A, 3B PIXEL ARRAY SECTION
10 ISOLATION REGION
17, 17A PHOTOELECTRIC CONVERSION LAYER
18, 18A UPPER ELECTRODE (EXAMPLE OF ELECTRODE LAYER)
19, 19A PROTECTIVE LAYER
20 ORGANIC PHOTOELECTRIC CONVERSION SECTION
21 LOWER ELECTRODE
21A READING ELECTRODE
21B STORAGE ELECTRODE
21C SHIELD ELECTRODE
23, 23a CHARGE STORAGE LAYER
25 METAL FILM
1000 ELECTRONIC DEVICE

The invention claimed is:

1. A solid-state imaging element, comprising:
a pixel array section which includes a plurality of light receiving pixels, wherein
each light receiving pixel of the plurality of light receiving pixels includes a photoelectric conversion layer and a charge storage layer,
the photoelectric conversion layer is made of an organic material,
the charge storage layer is configured to store a charge generated in the photoelectric conversion layer, and
the photoelectric conversion layer and the charge storage layer are side by side in the each light receiving pixel;
an isolation region between a first light receiving pixel of the plurality of light receiving pixels and a second light receiving pixel of the plurality of light receiving pixels, wherein the first light receiving pixel is adjacent to the second light receiving pixel in the pixel array section;
a light shielding section configured to suppress incidence of light on the charge storage layer, wherein the charge storage layer is in the isolation region; and
a shield electrode configured to apply a bias voltage to the charge storage layer.

2. The solid-state imaging element according to claim 1, wherein
the light shielding section is a metal film in the isolation region and the metal film is closer to a light incident side in comparison to the charge storage layer.

3. The solid-state imaging element according to claim 1, wherein
the photoelectric conversion layer is closer to a light incident side in comparison to the charge storage layer, and
the light shielding section is the photoelectric conversion layer in the isolation region.

4. The solid-state imaging element according to claim 1, wherein
the each light receiving pixel further includes an electrode layer, wherein the electrode layer is closer to a light incident side in comparison to the photoelectric conversion layer and the charge storage layer, and
the light shielding section is the electrode layer in the isolation region.

5. The solid-state imaging element according to claim 1, wherein
the each light receiving pixel further includes a protective layer, wherein the protective layer is closer to a light incident side in comparison to the photoelectric conversion layer and the charge storage layer, and
the light shielding section is the protective layer in the isolation region.

6. The solid-state imaging element according to claim 1, wherein
the light shielding section is further configured to suppress transmission of light having a wavelength shorter than a wavelength in a green wavelength region.

7. An electronic device, comprising:
a solid-state imaging element;
an optical system configured to:
capture incident light from a subject; and
form an image on an imaging surface of the solid-state imaging element; and
a signal processing circuit configured to execute a process on an output signal from the solid-state imaging element, wherein
the solid-state imaging element includes:
a pixel array section which includes a plurality of light receiving pixels, wherein
each light receiving pixel of the plurality of light receiving pixels includes a photoelectric conversion layer and a charge storage layer,
the photoelectric conversion layer is made of an organic material,
the charge storage layer is configured to store a charge generated in the photoelectric conversion layer, and
the photoelectric conversion layer and the charge storage layer are side by side in the each light receiving pixel;
an isolation region between a first light receiving pixel of the plurality of light receiving pixels and a second light receiving pixel of the plurality of light receiving pixels, wherein the first light receiving pixel is adjacent to the second light receiving pixel in the pixel array section;
a light shielding section configured to suppress incidence of light on the charge storage layer, wherein the charge storage layer is in the isolation region; and
a shield electrode configured to apply a bias voltage to the charge storage layer.

* * * * *